United States Patent
Byun et al.

(10) Patent No.: US 11,695,217 B2
(45) Date of Patent: Jul. 4, 2023

(54) RADIO FREQUENCY DEVICE AND DISPLAY DEVICE HAVING THE SAME

(71) Applicants: SAMSUNG DISPLAY CO., LTD., Yongin-si (KR); ULSAN NATIONAL INSTITUTE OF SCIENCE AND TECHNOLOGY, Ulsan (KR)

(72) Inventors: Gangil Byun, Ulsan (KR); Seongryong Lee, Hwaseong-si (KR); Jae-Kyoung Kim, Hwaseong-si (KR); Thi Duyen Nguyen, Ulsan (KR); Jinmyeong Heo, Suwon-si (KR)

(73) Assignees: SAMSUNG DISPLAY CO., LTD., Yongin-si (KR); ULSAN NATIONAL INSTITUTE OF SCIENCE AND TECHNOLOGY, Ulsan (KR)

( * ) Notice: Subject to any disclaimer, the term of this patent is extended or adjusted under 35 U.S.C. 154(b) by 270 days.

(21) Appl. No.: 17/102,670

(22) Filed: Nov. 24, 2020

(65) Prior Publication Data
US 2021/0296788 A1   Sep. 23, 2021

(30) Foreign Application Priority Data
Mar. 18, 2020   (KR) .................... 10-2020-0032990

(51) Int. Cl.
*H01Q 21/06* (2006.01)
*H01Q 1/24* (2006.01)
(Continued)

(52) U.S. Cl.
CPC .......... *H01Q 21/065* (2013.01); *G06F 3/044* (2013.01); *G06F 3/0446* (2019.05);
(Continued)

(58) Field of Classification Search
CPC .......... H01Q 21/065; H01Q 1/24; H01Q 1/36; H01Q 5/307; H01Q 21/06; G06F 3/0446; G06F 3/0448; G06F 3/044
(Continued)

(56) References Cited

U.S. PATENT DOCUMENTS 10,326,198 B2   6/2019   Kim et al.
10,732,764 B1*  8/2020   Shanmugam ............ H01Q 1/44
(Continued)

FOREIGN PATENT DOCUMENTS

KR   10-2016-0036436   4/2016
KR   10-2016-0080444   7/2016
(Continued)

OTHER PUBLICATIONS

Malekpoor et al., "Improved Radiation Performance of Low Profile Printed Slot Antenna Using Wideband Plannar AMC Surface," IEEE Transactions on Antenna and Propagation, vol. 64, No. 11, Nov. 2016, pp. 4626-4638.
(Continued)

*Primary Examiner* — Hai V Tran
(74) *Attorney, Agent, or Firm* — F. Chau & Associates, LLC

(57) ABSTRACT

A display device includes a display panel, a conductive layer disposed on the display panel and including a plurality of first patterns and a plurality of second patterns having a shape different from the first patterns, and an antenna element spaced from the conductive layer and operating in each of a first frequency band and a second frequency band. A first signal within the first frequency band constructively interferes with a first reflected signal corresponding to the first signal reflected at least partially by the first patterns, and a second signal within the second frequency band constructively interferes with a second reflected signal corresponding to the second signal reflected at least partially by the second patterns.

24 Claims, 15 Drawing Sheets

(51) Int. Cl.
  *H01Q 1/36* (2006.01)
  *H01Q 5/307* (2015.01)
  *G06F 3/044* (2006.01)
(52) U.S. Cl.
  CPC ............ *G06F 3/0448* (2019.05); *H01Q 1/24* (2013.01); *H01Q 1/36* (2013.01); *H01Q 5/307* (2015.01); *H01Q 21/06* (2013.01)
(58) Field of Classification Search
  USPC ........................................................ 343/720
  See application file for complete search history.

(56) References Cited

U.S. PATENT DOCUMENTS

| | | | | |
|---|---|---|---|---|
| 2006/0164309 | A1* | 7/2006 | Fujishima | ................ H01Q 1/38 343/700 MS |
| 2012/0242556 | A1* | 9/2012 | Ando | ....................... H01Q 9/42 343/834 |
| 2016/0126614 | A1* | 5/2016 | Lim | ........................ H01Q 1/44 343/720 |
| 2016/0190678 | A1 | 6/2016 | Hong et al. | |
| 2020/0136234 | A1* | 4/2020 | Paulotto | .............. H01Q 15/0026 |
| 2021/0126374 | A1* | 4/2021 | Mallegol | ............... H01Q 11/105 |
| 2021/0200379 | A1* | 7/2021 | Youk | ..................... G06F 3/0412 |
| 2021/0247871 | A1* | 8/2021 | Kim | ....................... G06F 3/0416 |
| 2022/0328955 | A1* | 10/2022 | Park | ......................... H01Q 1/48 |

FOREIGN PATENT DOCUMENTS

| | | |
|---|---|---|
| KR | 10-2019-0019802 | 2/2019 |
| KR | 10-2019-0069226 | 6/2019 |
| KR | 10-2020-0014965 | 2/2020 |

OTHER PUBLICATIONS

Zheng, et al., "Wideband RCS Reduction of a Microstrip Antenna Using Artificial Magnetic Conductor Structures", IEEE Antenna and Wireless Progagation Letters, vol. 14, 2015, pp. 1582-1585.

Hadarig, et al., "Novel Bow-tie—AMC Combination for 5.8-GHz RFID Tags Usable With Metallic Objects", IEEE Antennas and Wireless Propagation Letters, vol. 9, 2010, pp. 1217-1220.

* cited by examiner

# RADIO FREQUENCY DEVICE AND DISPLAY DEVICE HAVING THE SAME

CROSS-REFERENCE TO RELATED APPLICATION

This U.S. non-provisional patent application claims priority under 35 U.S.C. § 119 of Korean Patent Application No. 10-2020-0032990, filed on Mar. 18, 2020, the contents of which are hereby incorporated by reference in its entirety.

FIELD OF DISCLOSURE

The present disclosure relates to a radio frequency (RF) device enabling broadband communication and more particularly to a display device including the RF device.

DISCUSSION OF THE RELATED ART

A display device includes circuitry arranges in electronic modules. Such a display device may be a portable terminal or a wearable device, where the electronic modules include an antenna module, a camera module, or a battery module. With current trends of manufacturing thinner/smaller portable terminals wearable devices, the space ("available device real estate") in which the electronic modules are mounted is gradually diminishing. In addition, as the display devices become highly functional and are developed to meet to stringent specifications, the number of electronic modules included in the display devices is increasing.

Recent display devices include antennas that may be mounted in an active region of a display, such that images are projected through a mesh conductive material of the antennas. Some applications require multi-band antenna operation through such antennas, which is achieved only through the use of complex feed lines.

Small, compact multi-band antennas are also desirable in stand-alone RF device applications (other than those integrated with display devices).

SUMMARY

Embodiments of the inventive concept provide a display device including a display panel having an active area for projecting an image, a conductive layer disposed on the active area and including a plurality of first patterns and a plurality of second patterns each having a shape different from each of the first patterns, and an antenna element disposed on the conductive layer and operating in each of a first frequency band and a second frequency band. A first signal within the first frequency band constructively interferes with a first reflected signal corresponding to the first signal reflected at least partially by the first patterns, and a second signal within the second frequency band constructively interferes with a second reflected signal corresponding to the second signal reflected at least partially by the second patterns.

In various embodiments:

The conductive layer may include a plurality of first groups and a plurality of second groups alternately arranged with the first groups and defined therein, each of the first groups includes the first patterns arranged in two-by-two array, and each of the second groups includes the second patterns arranged in two-by-two array.

Each of the first patterns may include a first sub-pattern and a second sub-pattern surrounding the first sub-pattern, a first opening is defined between the first sub-pattern and the second sub-pattern to surround the first sub-pattern, each of the second patterns includes a third sub-pattern, a fourth sub-pattern surrounding the third sub-pattern, and a fifth sub-pattern surrounding the fourth sub-pattern, a second opening is defined between the third sub-pattern and the fourth sub-pattern to surround the third sub-pattern, and a third opening is defined between the fourth sub-pattern and the fifth sub-pattern to surround the fourth sub-pattern.

The first sub-pattern and the third sub-pattern may have a square shape, and the second sub-pattern, the fourth sub-pattern, and the fifth sub-pattern may have a quadrangular ring shape.

The first opening may have a first size greater than a second size of the second opening, and the second size may be greater than a third size of the third opening.

The first sub-pattern has a size greater than a size of the third sub-pattern.

Each of the first patterns has a same size as a size of each of the second patterns.

Each of the first patterns is provided with one opening defined therein, and each of the second patterns is provided with two openings defined therein.

A difference in phase between a signal incident in the first frequency band and a signal reflected from each of the first patterns is zero (0), and a difference in phase between a signal incident in the second frequency band and a signal reflected from each of the second patterns is zero (0).

The antenna element includes a first slot defined therein and operating in the first frequency band and a second slot defined therein and operating in the second frequency band, the first frequency band is higher than the second frequency band, and the first slot has a width smaller than a width of the second slot.

The antenna element further includes a third slot defined therein, operating in a third frequency band higher than the first frequency band and the second frequency band, and having a width smaller than the width of the first slot, and a third signal including the third frequency band constructively interferes with a third reflected signal corresponding to the third signal reflected by the second patterns.

The antenna element, the first patterns, and the second patterns have a mesh structure.

The display device further includes an input sensing unit disposed on the display panel and including a plurality of sensing electrodes. The antenna element is disposed on a same layer as some portions among the sensing electrodes, and the conductive layer is disposed on a same layer as the other portions among the sensing electrodes.

The display device further includes an input sensing unit disposed on the display panel and including a plurality of sensing electrodes. The conductive layer is disposed on the input sensing unit.

Embodiments of the inventive concept provide a radio frequency device including a base layer, a conductive layer disposed on the base layer and including a plurality of first groups of conductive structures and a plurality of second groups of conductive structures having a different shape from the first groups and alternately arranged with the first groups, a dielectric layer disposed on the conductive layer, and an at least one antenna element disposed on the dielectric layer and operating in each of a first frequency band and a second frequency band.

A first signal including the first frequency band constructively interferes with a first reflected signal corresponding to the first signal reflected by the first groups, and a second signal including the second frequency band constructively interferes with a second reflected signal corresponding to the second signal reflected by the second groups.

Each of the first groups includes four first patterns arranged in two-by-two array, and each of the second groups includes four second patterns arranged in two-by-two array. Each of the four first patterns includes a first sub-pattern and a second sub-pattern surrounding the first sub-pattern, a first opening is defined between the first sub-pattern and the second sub-pattern to surround the first sub-pattern, each of the four second patterns includes a third sub-pattern, a fourth sub-pattern surrounding the third sub-pattern, and a fifth sub-pattern surrounding the fourth sub-pattern, a second opening is defined between the third sub-pattern and the fourth sub-pattern to surround the third sub-pattern, and a third opening is defined between the fourth sub-pattern and the fifth sub-pattern to surround the fourth sub-pattern.

A length of one side defining the first opening is greater than a length of one side defining the second opening and is smaller than a length of one side defining the third opening.

The dielectric layer has a thickness equal to or greater than about 50 micrometers and equal to or smaller than about 150 micrometers.

According to the above, the radio frequency device includes the antenna element and the conductive layer. The signal emitted from the antenna element constructively interferes with the signal reflected by the conductive layer. The radio frequency device emits the signal with improved intensity, and the bandwidth of each of the frequencies at which the radio frequency device operates increases.

The antenna element emits the wireless communication signals to the thickness direction thereof due to the slots defined by left-right symmetry. The wireless communication signals have a certain directivity, and thus, a communication efficiency is improved.

The antenna element is provided with the slots defined therein. The slots operate at different frequency bands from each other. The antenna elements operating in multiple frequency bands are connected to one antenna line. The number of the antenna lines disposed in the peripheral area is reduced, and the size of the peripheral area is reduced.

In another aspect, a radio frequency antenna includes a base layer; a ground plane layer disposed on the base layer and comprising a plurality of first slots in a first configuration and a plurality of second slots in a second configuration, the plurality of first slots being interspersed with the plurality of second slots; a dielectric layer disposed on the ground plane layer; and at least one microstrip patch antenna element disposed on the dielectric layer, the microstrip patch antenna element comprising a plurality of slots enabling the antenna element to resonate at a plurality of respective frequencies.

The conductive layer has sub-patterns having different shapes from each other. Accordingly, a Moiré phenomenon that occurs when patterns of the same shape are repeatedly arranged is prevented. Thus, a visibility of the image displayed through the display device is improved.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

Figure 1:
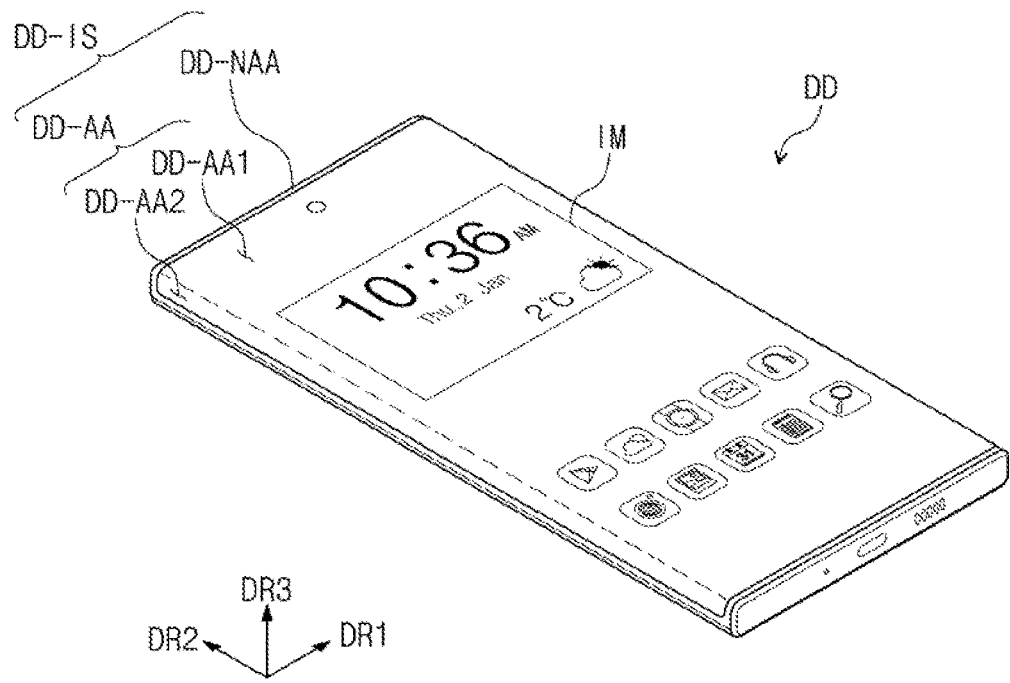
FIG. 1 is a perspective view showing a display device according to an exemplary embodiment of the present disclosure.

In the present disclosure, it will be understood that when an element or layer is referred to as being "on", "connected to" or "coupled to" another element or layer, it can be directly on, connected or coupled to the other element or layer or intervening elements or layers may be present.

Like numerals refer to like elements throughout. In the drawings, the thickness, ratio, and dimension of components may be exaggerated for effective description of the technical content.

As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another element(s) or feature(s) as illustrated in the figures.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, the present disclosure will be explained in detail with reference to the accompanying drawings.

FIG. 1 is a perspective view showing a display device DD according to an exemplary embodiment of the present disclosure. The display device DD may be a device that is activated in response to an electrical signal. For example, the display device DD may be a mobile phone, a tablet computer, a car navigation unit, a game unit, or a wearable unit, etc. FIG. 1 shows the mobile phone as a representative example of the display device DD.

The display device DD may display an image IM through a display surface DD-IS. The display surface DD-IS may include an active area DD-AA and a peripheral area DD-NAA defined adjacent to the active area DD-AA. The image IM may be displayed through the active area DD-AA and may not be displayed through the peripheral area DD-NAA. The image IM may include a still image as well as a motion image.

FIG. 1 shows application icons as a representative example of the image IM. The active area DD-AA may include a first active area DD-AA1 and a second active area DD-AA2 extending from the first active area DD-AA1. The second active area DD-AA2 may be defined in a bending area of the active area DD-AA. In other embodiments, the active area DD-AA is completely flat, and the second active area DD-AA2 may be defined at an edge of the active area DD-AA.

The first active area DD-AA1 may be substantially parallel to a plane defined by a first direction DR1 and a second direction DR2 crossing the first direction DR1. A third direction DR3 may indicate a normal line direction of the first active area DD-AA1, i.e., a thickness direction DR3 of the display device DD.

In the present exemplary embodiment, front (or upper) and rear (or lower) surfaces of each member or unit of the display device DD may be distinguished from each other by the third direction DR3. The third direction DR3 may cross the first direction DR1 and the second direction DR2. For example, the first, second, and third directions DR1, DR2, and DR3 may be substantially perpendicular to each other. In addition, in the following description, a face defined by the first direction DR1 and the second direction DR2 may be defined as a plane, and the expression "when viewed in a plane" may mean a state of being viewed from a viewpoint spaced from the face defined by the first and second directions DR1 and DR2, and viewed in the third direction DR3.

The second active area DD-AA2 may extend in a region along one side of the first active area DD-AA1. The second active area DD-AA2 may be provided in plural. In this case, the second active area DD-AA2 may extend in a region along at least two sides of the first active area DD-AA1. The active area DD-AA may include one first active area DD-AA1 and one or more and four or less second active areas DD-AA2.

Figure 2:
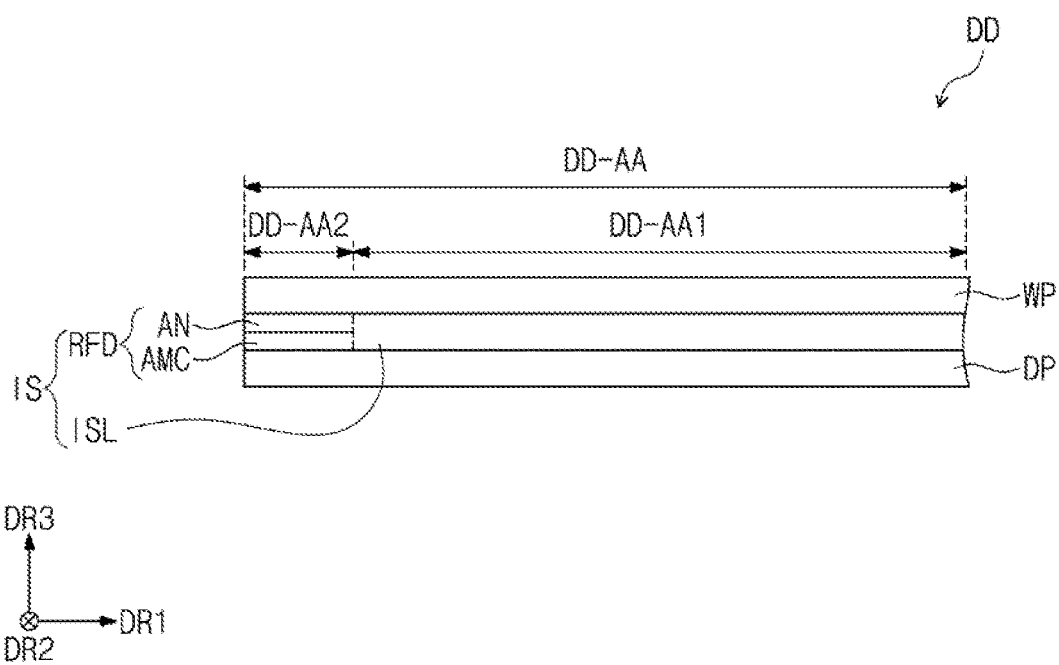
FIG. 2 is a cross-sectional view showing a display device according to an exemplary embodiment of the present disclosure.

FIG. 2 is a cross-sectional view through a section of the display device DD according to an exemplary embodiment of the present disclosure.

Referring to FIG. 2, the display device DD may include a display panel DP, an input sensor IS, and a window WP. The display panel DP may substantially generate the image IM (shown in FIG. 1). The display panel DP may be a light emitting type display panel, or other type such as an organic light emitting display panel or a quantum dot light emitting display panel. A light emitting layer of the organic light emitting display panel may include an organic light emitting material. A light emitting layer of the quantum dot light emitting display panel may include a quantum dot and/or a quantum rod.

The input sensor IS may be disposed on the display panel DP. When viewed in a plane, the input sensor IS may overlap the active area DD-AA. The input sensor IS may be formed on the display panel DP through successive material deposition processes. Alternatively, the input sensor IS may be formed by coupled the same to the display panel DP by an adhesive member. The adhesive member may include a conventional adhesive. The adhesive member may be a transparent adhesive member, such as a pressure sensitive adhesive (PSA) film, an optically clear adhesive (OCA) film, or an optically clear resin (OCR).

The input sensor IS may include an input sensing unit ISL and a radio frequency (RF) device RFD. The input sensing unit ISL may sense an external input applied thereto from the outside. The external input may be a user input. The user input may include a variety of external inputs, such as a part of user's body (a "touch input"), light, heat, pen, or pressure. The input sensing unit ISL may overlap the first active area DD-AA1 when viewed in a plane. Note that the RF device RFD portion of the input sensing unit ISL may be considered a sensor element by sensing incident RF signals. If used only for transmitting signals, the RF device RFD is not used as a sensing element.

The RF device RFD may be disposed on the same layer as the input sensing unit ISL. The RF device RFD may be disposed adjacent to an outer portion of the input sensing unit ISL. The RF device RFD may overlap the second active area DD-AA2 when viewed in a plane. Although the display device DD becomes smaller or thinner or a size of the peripheral area DD-NAA (refer to FIG. 1) is reduced, a space in which the RF device RFD is to be disposed may be secured since the active area DD-AA is secured. In other words, the RF device RFD may not impede the projection of images from within an underlaying region of the active area DD-AA. The RF device RFD may be substantially simultaneously formed with the input sensing unit ISL. In other fabrication examples, the RF device RFD and the input sensing unit ISL are formed separately through different processes.

The RF device RFD may include an antenna layer AN and a conductive layer AMC. The antenna layer AN may transmit and/or receive a plurality of wireless communication signals, for example, a plurality of RF signals. The wireless communication signals may have different frequency bands from each other.

The conductive layer AMC may be disposed under the antenna layer AN. A dielectric layer (e.g., IS-IL1 of FIG. 7A, but not shown in FIG. 1) may separate the antenna layer AN from the conductive layer AMC. The conductive layer AMC may reflect signals emitted from the antenna layer AN and thereby act as a ground plane for antenna elements of the antenna layer AN. The signals reflected by the conductive layer AMC may interfere constructively with the signal emitted from the antenna layer AN. Antenna elements of the antenna layer AN may be in the form of microstrip patches, each with a plurality of slots as described hereafter. The conductive layer AMC may also include a plurality of slots, e.g., ring-shaped slots, which may function to improve the frequency bandwidth of the RF device RFD.

The window WP may be disposed on the input sensor IS. The window WP may include an optically transparent insulating material. For example, the window WP may include a glass or plastic material. The window WP may have a single-layer or multi-layer structure. As an example, the window WP may include a plurality of plastic films attached to each other by an adhesive or a glass substrate and a plastic film attached to the glass substrate by an adhesive.

Figure 3:
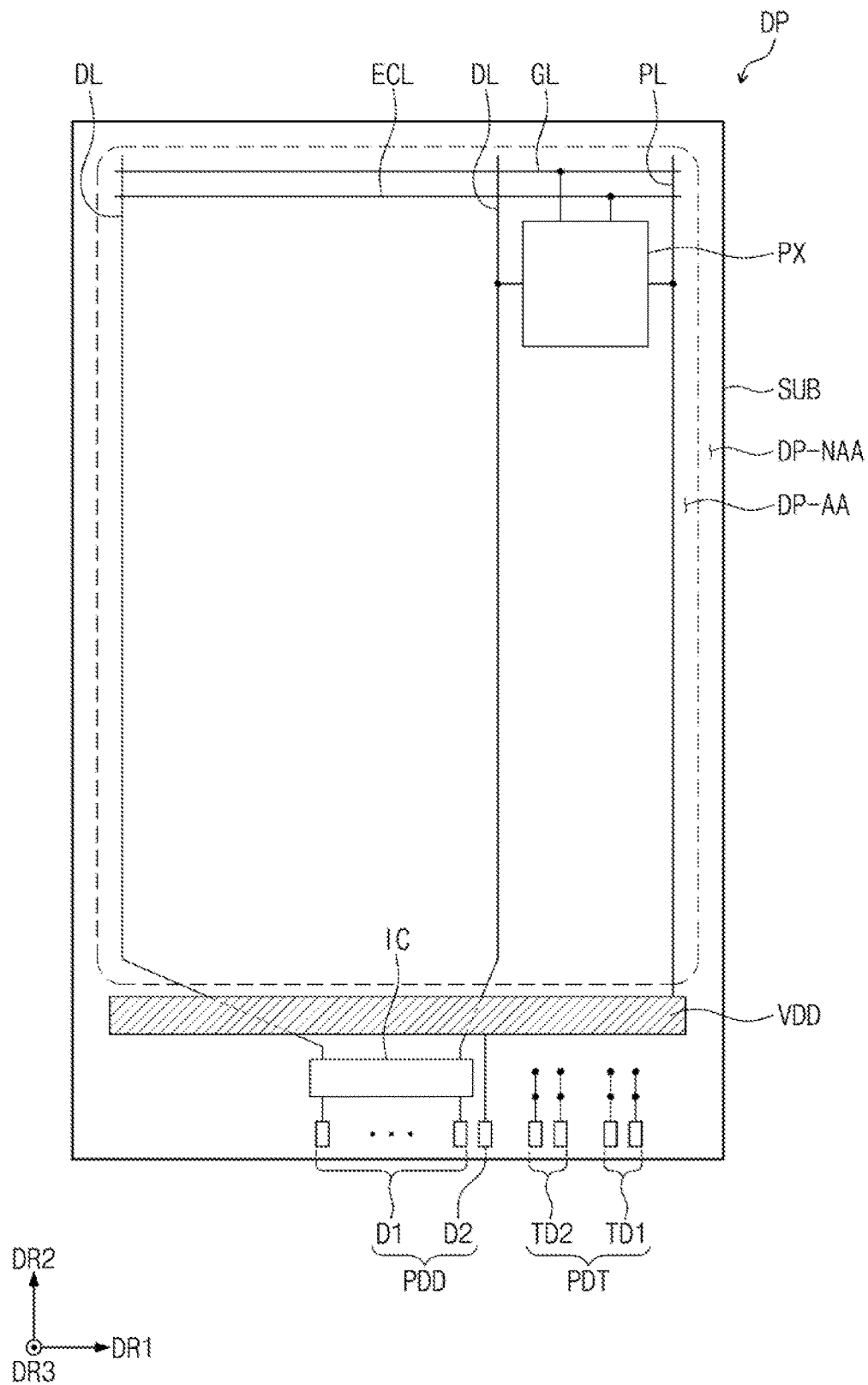
FIG. 3 is a plan view showing a display panel according to an exemplary embodiment of the present disclosure.

FIG. 3 is a plan view showing the display panel DP according to an exemplary embodiment of the present disclosure. Here, the display panel DP may include an active area DP-AA and a peripheral area DP-NAA defined adjacent to the active area DP-AA. For instance, the active area DP-AA may occupy a central region of the display device DD and the peripheral area DP-NAA may surround at least a portion of the active area DP-AA. The active area DP-AA may be an area through which the image IM (refer to FIG. 1) is displayed. The peripheral area DP-NAA may be an area in which a driving circuit or a driving line is disposed. A plurality of pixels PX (one of which is shown exaggerated in size in FIG. 3) may be disposed in the active area DP-AA. The active area DP-AA may correspond to the active area DD-AA of the display device DD (refer to FIG. 1). The peripheral area DP-NAA may correspond to the peripheral area DD-NAA (refer to FIG. 1) of the display device DD (refer to FIG. 1).

The display panel DP may include a base layer SUB, the pixels PX, a plurality of signal lines GL, DL, PL, and ECL, a plurality of display pads PDD, and a plurality of sensing pads PDT.

The signal lines GL, DL, PL, and ECL may be disposed on the base layer SUB. The signal lines GL, DL, PL, and ECL may be connected to the pixels PX to transmit electrical signals to the pixels PX. The signal lines GL, DL, PL, and ECL may include a plurality of scan lines GL, a plurality of data lines DL, a plurality of power lines PL, and a plurality of light emitting control lines ECL, however, these are merely exemplary. Configurations of the signal lines GL, DL, PL, and ECL should not be limited thereto or thereby. The signal lines GL, DL, PL, and ECL may further include an initialization voltage line.

A power strip VDD may be disposed in the peripheral area DP-NAA. The power strip VDD may be connected to the power lines PL. As the display panel DP includes the power strip VDD, the pixels PX may receive a uniform power supply signal.

The display pads PDD may be disposed at the peripheral area DP-NAA. The display pads PDD may include a first pad D1 and a second pad D2. The first pad D1 may be provided in plural, and the first pads D1 may be respectively connected to the data lines DL. The second pad D2 may be connected to the power strip VDD to be electrically connected to the power line PL. The display panel DP may apply the electrical signals, which are provided from the outside through the display pads PDD, to the pixels PX. Meanwhile, the display pads PDD may further include pads to receive other electrical signals in addition to the first and second pads D1 and D2.

A driving chip IC may be mounted in the peripheral area DP-NAA. The driving chip IC may be a chip-type timing control circuit. The data lines DL may be electrically connected to the first pads D1 through the driving chip IC, respectively. However, this is merely exemplary, and the driving chip IC according to the exemplary embodiment of the present disclosure may be mounted on a film separated from the display panel DP. In this case, the driving chip IC may be electrically connected to the display pads PDD through the film. The sensing pads PDT may be disposed in the peripheral area DP-NAA. The sensing pads PDT may be electrically connected to a plurality of sensing electrodes of the input sensor IS (refer to FIG. 2) described below, respectively. The sensing pads PDT may include a plurality of first sensing pads TD1 and a plurality of second sensing pads TD2.

Figure 4:
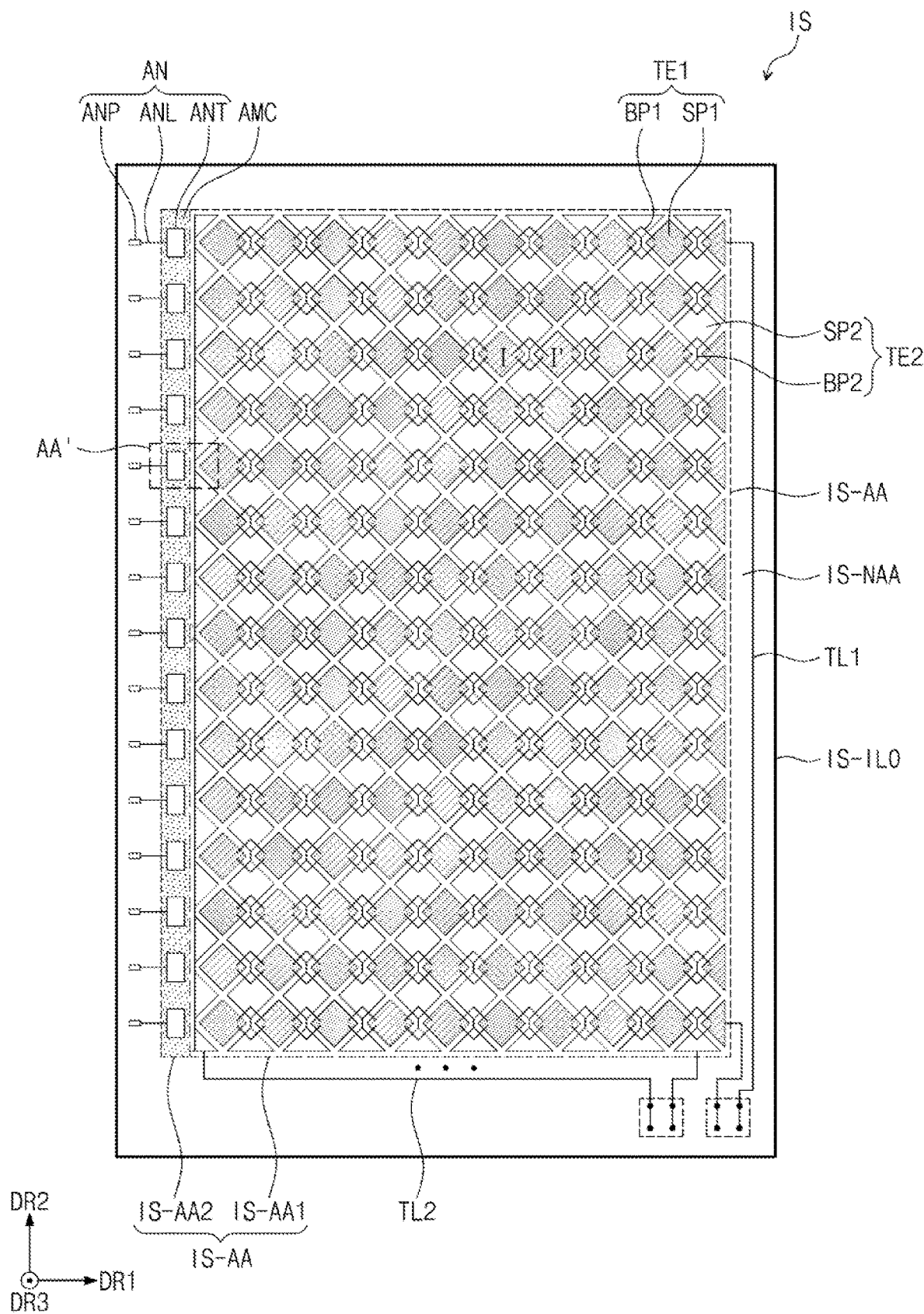
FIG. 4 is a plan view showing an input sensor according to an exemplary embodiment of the present disclosure.

FIG. 4 is a plan view showing the input sensor IS according to an exemplary embodiment of the present disclosure.

Referring to FIG. 4, the input sensor IS may include an active area IS-AA and a peripheral area IS-NAA, which are defined therein. The active area IS-AA may be an area that is activated in response to electrical signals. For example, the active area IS-AA may be an area in which an input is sensed. The active area IS-AA may correspond to the active area DD-AA of the display device DD (refer to FIG. 1). When viewed in a plane, the active area IS-AA may overlap the active area DP-AA of the display panel DP (refer to FIG. 3).

The active area IS-AA may include a first active area IS-AA1 and a second active area IS-AA2. The first active area IS-AA1 may correspond to the first active area DD-AA1 (refer to FIG. 1) of the display device DD (refer to FIG. 1). The second active area IS-AA2 may correspond to the second active area DD-AA2 (refer to FIG. 1) of the display device DD (refer to FIG. 1).

The peripheral area IS-NAA may surround the active area IS-AA. The peripheral area IS-NAA may correspond to the peripheral area DD-NAA (refer to FIG. 1) of the display device DD (refer to FIG. 1). When viewed in a plane, the peripheral area IS-NAA may overlap the peripheral area DP-NAA of the display panel DP (refer to FIG. 3).

The input sensor IS may include a base insulating layer IS-IL0, the input sensing unit ISL (refer to FIG. 2), and the RF device RFD. The base insulating layer IS-IL0 may be an inorganic layer that includes one of silicon nitride, silicon oxynitride, and silicon oxide. As another way, the base insulating layer IS-IL0 may be an organic layer that includes an epoxy resin, an acrylic resin, or an imide-based resin. The base insulating layer IS-IL0 may be formed directly on the display panel DP (refer to FIG. 2). As another way, the base insulating layer IS-IL0 may be formed on a separate base layer, and the base layer may be coupled to the display panel DP (refer to FIG. 2) by an adhesive member.

The input sensing unit ISL (refer to FIG. 2) may be disposed in the first active area IS-AA1. The input sensing unit ISL (refer to FIG. 2) may include a plurality of first sensing electrodes TE1, a plurality of second sensing electrodes TE2, and a plurality of sensing lines TL1 and TL2. The first sensing electrodes TE1 and the second sensing electrodes TE2 may be disposed in the first active area IS-AA1, and the sensing lines TL1 and TL2 may be disposed in the peripheral area IS-NAA.

The input sensing unit ISL (refer to FIG. 2) may obtain information about the external input based on a variation in capacitance between the first sensing electrodes TE1 and the second sensing electrodes TE2.

The first sensing electrodes TE1 may extend in the first direction DR1. Each of the first sensing electrodes TE1 may include a plurality of sensing patterns SP1 and a plurality of bridge patterns BP1. The sensing patterns SP1 may be arranged in the first direction DR1. The sensing patterns SP1 may be referred to as first sensing patterns SP1. FIG. 4 shows a structure in which two bridge patterns BP1 are connected to two sensing patterns SP1 adjacent to each other. Other connection arrangements may be substituted. For example, two sensing patterns SP1 adjacent to each other may be connected to each other by one bridge pattern BP1.

The second sensing electrodes TE2 may extend in the second direction DR2. The second sensing electrodes TE2 may be arranged in the first direction DR1. Each of the second sensing electrodes TE2 may include a plurality of first portions SP2 and a plurality of second portions BP2. The first portions SP2 may be arranged in the second direction DR2. The first portions SP2 may be referred to as second sensing patterns SP2. The second portions BP2 may be disposed on a layer different from a layer on which the bridge patterns BP1 are disposed. The bridge patterns BP1 may be insulated from the second sensing electrodes TE2 while crossing the second sensing electrodes TE2. For example, the second portions BP2 may be insulated from the bridge patterns BP1 while crossing the bridge patterns BP1.

The sensing lines TL1 and TL2 may include a plurality of first sensing lines TL1 and a plurality of second sensing lines TL2. The first sensing lines TL1 may be electrically connected to the first sensing electrodes TE1, respectively. The second sensing lines TL2 may be electrically connected to the second sensing electrodes TE2, respectively.

The first sensing pads TD1 (refer to FIG. 3) may be electrically connected to the first sensing lines TL1 through contact holes, respectively. The second sensing pads TD2 (refer to FIG. 3) may be electrically connected to the second sensing lines TL2 through contact holes, respectively.

The RF device RFD may be disposed in the second active area IS-AA2. The RF device RFD may include the antenna layer AN and the conductive layer AMC. The antenna layer AN may include a plurality of antenna elements ANT, a plurality of antenna lines ANL, and a plurality of antenna pads ANP.

The antenna elements ANT may be disposed in the second active area IS-AA2, and the antenna pads ANP may be disposed in the peripheral area IS-NAA. The antenna lines ANL may electrically connect the antenna elements ANT to the antenna pads ANP, respectively.

The antenna elements ANT may be disposed on the same layer as some portions of the sensing electrodes TE1 and TE2. For example, the antenna elements ANT may be disposed on the same layer as the second portions BP2.

The antenna elements ANT may include the same material as the some portions of the sensing electrodes TE1 and TE2 and may be formed through the same process as the some portions of the sensing electrodes TE1 and TE2. For example, the second portions BP2 and the antenna elements ANT may include a carbon nanotube, a metal material, a metal alloy, or composites thereof and may have a single-layer structure or a multi-layer structure in which titanium (Ti), aluminum (Al), and titanium (Ti) are sequentially stacked. However, this is merely exemplary, and the antenna elements ANT may include different materials from that of the second portions BP2 and may be formed through a separate process. For example, the second portions BP2 may have a multi-layer structure in which titanium (Ti), aluminum (Al), and titanium (Ti) are sequentially stacked, and the antenna elements ANT may include a carbon nanotube, a metal material, a metal alloy, or composites thereof and may have a single-layer or multi-layer structure. For example, the metal material may be silver (Ag), copper (Cu), aluminum (Al), gold (Au), or platinum (Pt).

When viewed in a plane, the antenna elements ANT may overlap the active area DP-AA of the display panel DP (refer to FIG. 3). The antenna elements ANT may have a mesh structure that allows the image IM (refer to FIG. 1) provided from the active area DP-AA (refer to FIG. 3) to transmit therethrough. The mesh structure may mean a structure in which a plurality of openings is defined through a predetermined layer. The antenna elements ANT may be changed to a variety of shapes in the second active area IS-AA2, and a design freedom of the antenna elements ANT may be improved.

The antenna lines ANL may include the same material as the antenna elements ANT and may be formed through the same process as the antenna elements ANT. The antenna lines ANL may extend from the antenna elements ANT to the peripheral area IS-NAA.

The antenna pads ANP may be electrically connected to the antenna lines ANL, respectively.

The conductive layer AMC may be disposed under the antenna layer AN. The conductive layer AMC may be disposed in the second active area IS-AA2. The conductive layer AMC may be disposed on the same layer as the other portions of the sensing electrodes TE1 and TE2, which are disposed on a different layer from the some portions of the sensing electrodes TE1 and TE2 disposed on the same layer as the antenna elements ANT. For example, the conductive layer AMC may be disposed on the same layer as the bridge patterns BP1.

The conductive layer AMC may include the same material as and may be formed through the same process as some portions of the sensing electrodes TE1 and TE2. For example, the bridge patterns BP1 and the conductive layer AMC may include a carbon nanotube, a metal material, a metal alloy, or composites thereof and may have a single-layer structure or a multi-layer structure in which titanium (Ti), aluminum (Al), and titanium (Ti) are sequentially stacked. However, this is merely exemplary, and the conductive layer AMC may include different materials from that of the bridge patterns BP1 and may be formed through a separate process. For example, the bridge patterns BP1 may have a multi-layer structure in which titanium (Ti), aluminum (Al), and titanium (Ti) are sequentially stacked, and the conductive layer AMC may include a carbon nanotube, a metal material, a metal alloy, or composites thereof and may have a single-layer or multi-layer structure. For example, the metal material may be silver (Ag), copper (Cu), aluminum (Al), gold (Au), or platinum (Pt).

The RF device RFD (refer to FIG. 2) may further include at least one ground electrode disposed under the base insulating layer IS-IL0. In another example, such a ground electrode may be a portion of components of the display panel DP (refer to FIG. 3).

Figure 5A:
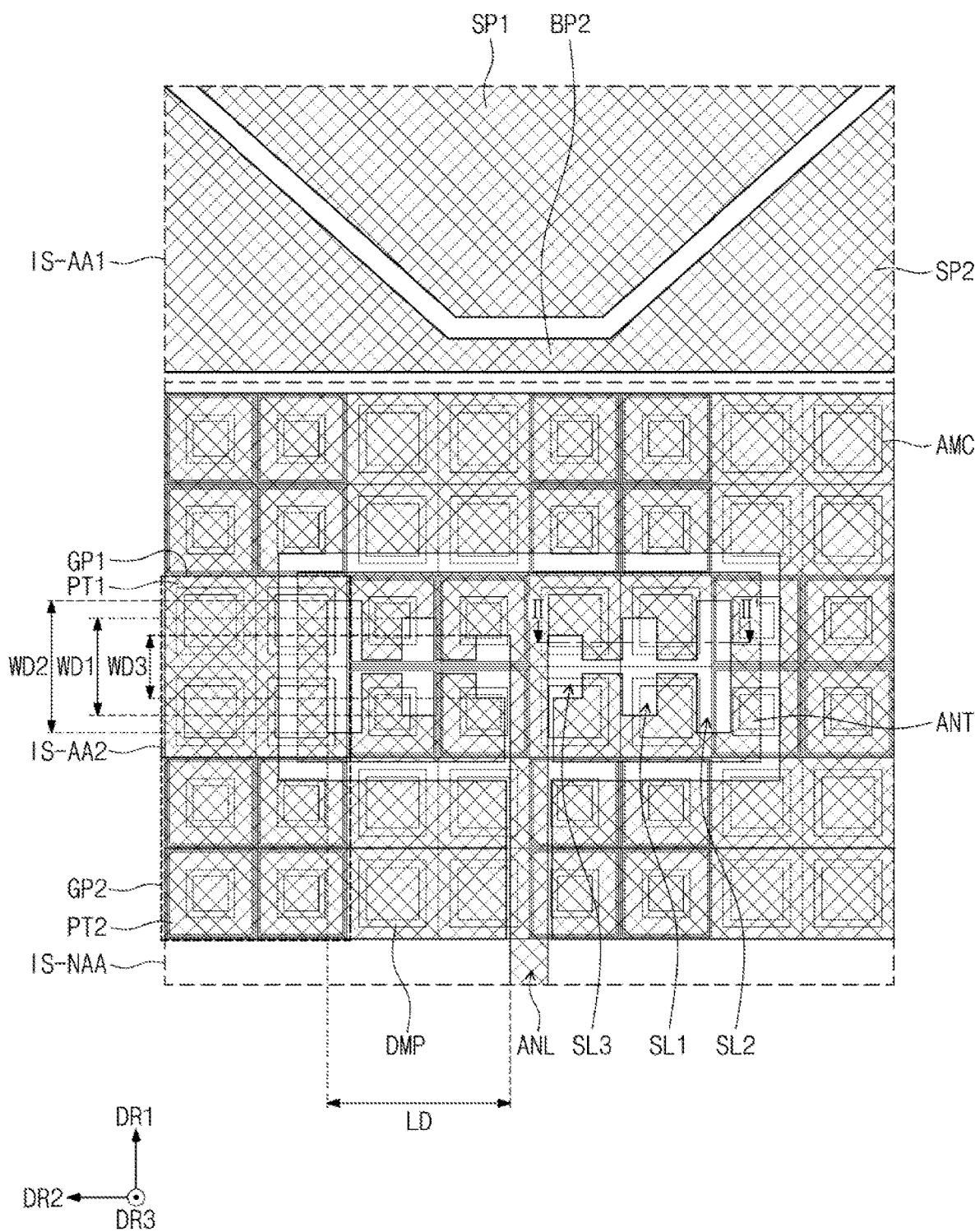
FIG. 5A is an enlarged plan view showing an area AA' of FIG. 4 according to an exemplary embodiment of the present disclosure.
Figure 5B:
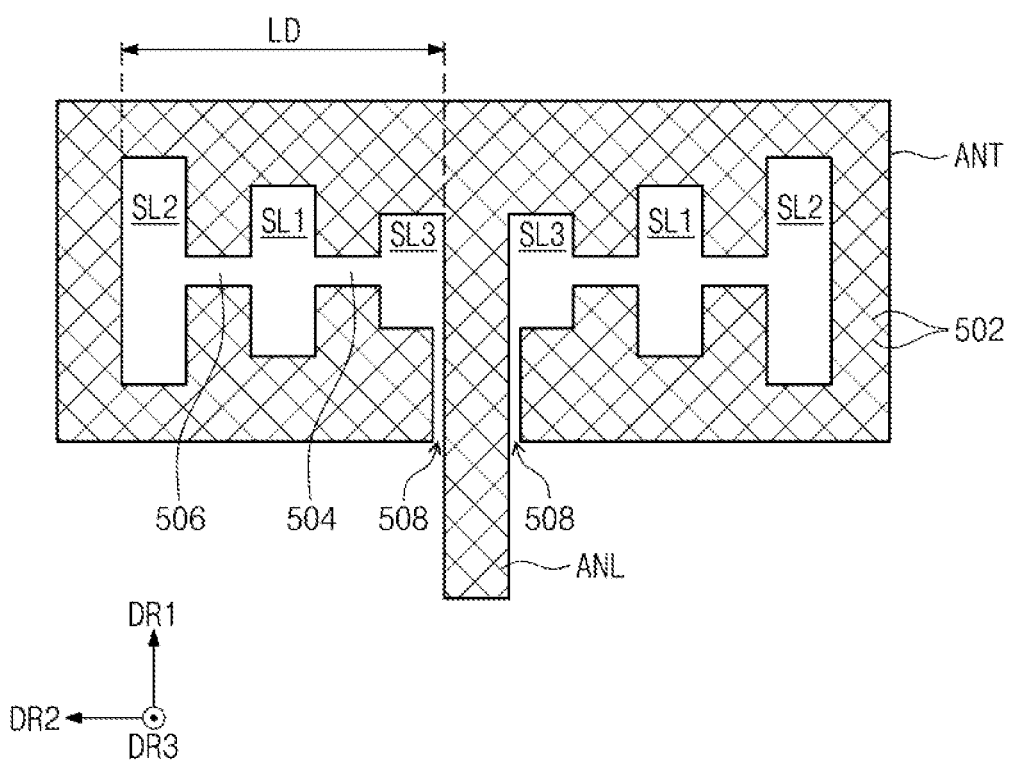
FIG. 5B is a plan view depicting just the antenna element in FIG. 5A.

FIG. 5A is an enlarged plan view showing an area AA' of FIG. 4 according to an exemplary embodiment of the present disclosure. FIG. 5B is a plan view of the antenna element depicted in FIG. 5A, without the underlaying and overlaying structures.

Referring to FIGS. 4, 5A and 5B, the antenna layer AN may further include a dummy pattern DMP. The first active area IS-AA1 in which the first sensing electrodes TE1 and the second sensing electrodes TE2 are disposed, the second active area IS-AA2 in which the antenna element ANT and the dummy pattern DMP are disposed, and the peripheral area IS-NAA in which the antenna lines ANL are disposed may be defined in the input sensor IS.

The dummy pattern DMP may surround the antenna element ANT. The dummy pattern DMP may have a mesh structure and may be composed of a non-conductive material to prevent interference with signals transmitted/received by the antenna element ANT. By providing the dummy pattern DMP in this manner, a difference in reflectance between an area in which the antenna element ANT is located and an area in which the antenna element ANT is not located may be reduced. Accordingly, the antenna element ANT may not be visible from the exterior from the exterior.

When the dummy pattern DMP is not included, there is a difference in each of the reflectance and transmittance between the area of the second active area IS-AA2 in which the antenna element ANT is not disposed and the first active area IS-AA1 and the area of the second active area IS-AA2 in which the antenna element ANT is disposed. However, when the dummy pattern DMP is included, the difference in reflectance and the difference in transmittance may be reduced. As a result, certain boundaries, e.g., a boundary between the antenna element ANT and the first portion SP2 or a boundary between the antenna element ANT and the second portion BP2, may be prevented from being observed.

The antenna element ANT may operate in each of a first frequency band, a second frequency band, and a third frequency band (all spanning a different range of frequencies than the others). Herein, the expression "the antenna element ANT operates in the frequency band" or like expressions may mean that the frequency band includes a resonant frequency resonated by the antenna element ANT. The antenna element ANT may transmit and/or receive a signal having the resonant frequency.

A first slot SL1 resonating in the first frequency band, a second slot SL2 resonating in the second frequency band, and a third slot SL3 resonating in the third frequency band may be defined in the antenna element ANT. Thus, the antenna element ANT may be a slot antenna. For instance, the antenna element ANT may be a microstrip patch with the slots SL1-SL3 formed within the patch conductor. The conductive layer AMC may serve as a ground plane for the patch. A dielectric substrate may separate the conductive layer AMC with the patch.

The third frequency band may be higher than the first frequency band. The first frequency band may be higher than the second frequency band. The first frequency band may include a first resonant frequency. For example, the first resonant frequency may be about 28 GHz. The second frequency band may include a second resonant frequency. For example, the second resonant frequency may be about 24 GHz. The third frequency band may include a third resonant frequency. For example, the third resonant frequency may be about 39 GHz. These are merely exemplary; resonant frequencies in various embodiments may include various frequencies depending on signals to be communicated.

The first slot SL1 may have a first width WD1 in the first direction DR1. The second slot SL2 may have a second width WD2 in the first direction DR1. The third slot SL3 may have a third width WD3 in the first direction DR1. The second width WD2 may be greater than the first width WD1. The first width WD1 may be greater than the third width WD3.

The respective widths of the slots SL1, SL2 and SL3 may be determinative of respective resonant frequencies of the slots. The larger the width, the lower the resonant frequency according to an equation in which the width is inversely proportional to the resonant frequency (the equation may also be a function of the dielectric constant of the dielectric substrate IS-IL1). Thus, the first width WD1 may be determinative of the first resonant frequency. For example, to realize a first resonant frequency of about 28 GHz, the first width WD1 may be in a range from about 2.9 mm to about 3.3 mm. In one example, the first width WD1 is about 3.1 mm. The second width WD2 may be determinative of the second resonant frequency. For example, to realize second width WD2 may be in a range from about 3.5 mm to about 3.9 mm, and the second width WD2 may be about 3.7 mm. However, this is merely exemplary, and the second width WD2 according to the exemplary embodiment of the present disclosure may be determined by the second resonant frequency. The third width WD3 may be inversely proportional to the third resonant frequency. For example, the third width WD3 may be in a range from about 1.1 mm to about 1.5 mm, and the third width WD3 may be about 1.3 mm. However, this is merely exemplary, and the third width WD3 according to the exemplary embodiment of the present disclosure may be determined by the third resonant frequency.

As illustrated in FIG. 5, each of the first, second and third slots SL1, SL2 and SL3 may be provided in plural. In this case, each of the plural slots SL1, the plural slots SL2 and the plural slots SL3 may be symmetrical with respect to the antenna line ANL. For example, each of the first slots SL1, the second slots SL2, and the third slots SL3 may be left-right symmetric with respect to the antenna line ANL.

According to the present disclosure, the antenna element ANT may radiate wireless communication signals in a directive manner by forming a main beam, where the third direction DR3 is within the main beam. The formation of the main beam may be due to the first slots SL1, the second slots SL2, and the third slots SL3, each being left-right symmetric with respect to the antenna line ANL. The main beam has a directivity higher than that of a free space element (which would be the case without the reflection of signal energy off the conductive layer AMC). With the higher directivity, communication efficiency may be improved. Accordingly, the radio frequency (RF) device RFD having improved communication efficiency, and the display device DD including the RF device RFD compactly integrated therein may be provided.

A width LD may be defined in the second direction DR2 between a left edge of a second slot SL2 and a right edge of the corresponding third slot SL3 on the each side of the antenna element ANT. The width LD may be designed to match the impedance of the antenna element ANT. In an example, the width LD is selected to optimize the impedance match at the second resonant frequency. As shown in FIG.

5B, the width LD equals the dimensions in the direction DR2 of: each of the slots SL1, SL2 and SL3; a first connecting slot 506 connecting the slots SL1 and SL2; and a second connecting slot 504 connecting the slots SL1 and SL3. It is further noted that the antenna element ANT as well as the antenna feed line ANL may be configured with a conductive mesh structure 502 outside the slot areas of the slots SL1-SL3. A pair of slits 508 may be present between a portion of the feed line ANL and an adjacent portion of mesh structure 502 of the antenna ANT. This is similar to an "inset fed" microstrip patch element. The slits 508 may serve to impedance match the antenna ANT with the antenna line ANL. In other embodiments, the slits 508 are omitted, whereby the antenna ANT may be akin to an "end fed" microstrip patch element. In still other embodiments, a probe feed mechanism may be implemented with respect to the antenna ANT (the antenna feed is oriented in the DR3 direction and connects to the mesh 502 of the antenna ANT).

According to the present disclosure, the first slots SL1, the second slots SL2, and the third slots SL3 may be defined in the antenna element ANT. The first slots SL1, the second slots SL2, and the third slots SL3 may resonate in different frequency bands from each other. One antenna element ANT may be fed through one antenna line ANL. The antenna element ANT operating in multiple frequency bands may be connected to one antenna line ANL. The number of the antenna lines ANL disposed in the peripheral area IS-NAA of the input sensor IS may be reduced. Accordingly, the RF device RFD (refer to FIG. 2) in which the size of the peripheral area IS-NAA is reduced and the display device DD (refer to FIG. 1) having the RF device RFD (refer to FIG. 2) may be provided.

The conductive layer AMC may be disposed under the antenna element ANT, the antenna line ANL, and the dummy pattern DMP. When viewed in the plane, the conductive layer AMC may overlap the antenna element ANT and the dummy pattern DMP.

The conductive layer AMC may be provided with a plurality of first groups GP1 and a plurality of second groups GP2, which are defined therein. Each of the first groups GP1 may include a plurality of first patterns PT1 arranged in two-by-two array. Each of the second groups GP2 may include a plurality of second patterns PT2 arranged in two-by-two array. The first patterns PT1 may have a shape different from that of the second patterns PT2.

Figure 6:
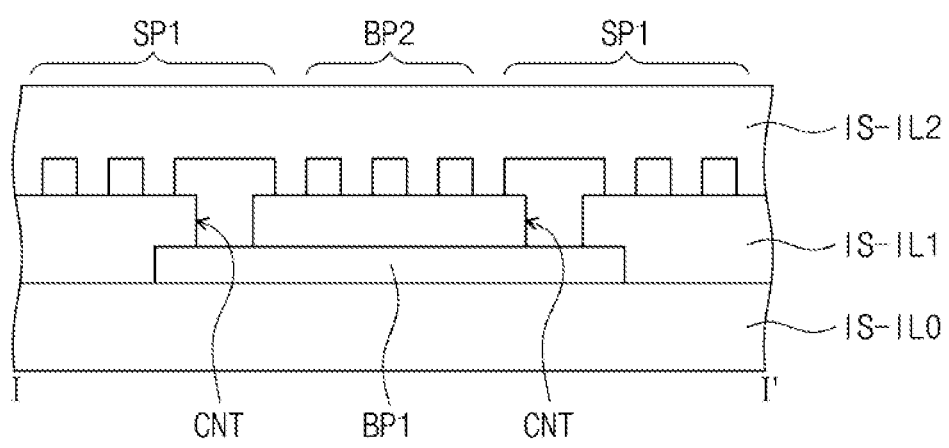
FIG. 6 is a cross-sectional view taken along a line I-I' of FIG. 4 according to an exemplary embodiment of the present disclosure.
Figure 6:
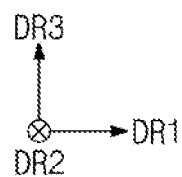

FIG. 6 is a cross-sectional view taken along a line I-I' of FIG. 4 according to an exemplary embodiment of the present disclosure.

Referring to FIGS. 4 and 6, the bridge patterns BP1 may be disposed on the base insulating layer IS-IL0. A first insulating layer IS-IL1 may be disposed on the bridge patterns BP1. The first insulating layer IS-IL1 may have a single-layer or multi-layer structure. The first insulating layer IS-IL1 may include an inorganic material, an organic material, or a composite material.

The sensing patterns SP1, the first portions SP2, and the second portions BP2 may be disposed on the first insulating layer IS-IL1. The sensing patterns SP1, the first portions SP2, and the second portions BP2 may have the mesh structure.

A plurality of contact holes CNT may be defined through the first insulating layer IS-IL1 in the third direction DR3. Two sensing patterns SP1 adjacent to each other among the sensing patterns SP1 may be electrically connected to the bridge pattern BP1 through the contact holes CNT.

A second insulating layer IS-IL2 may be disposed on the sensing patterns SP1, the first portions SP2, and the second portions BP2. The second insulating layer IS-IL2 may have a single-layer or multi-layer structure. The second insulating layer IS-IL2 may include an inorganic material, an organic material, or a composite material.

FIG. 6 shows a bottom bridge structure in which the bridge patterns BP1 are disposed under the sensing patterns SP1, the first portions SP2, and the second portions BP2, however, the input sensor IS should not be limited to the bottom bridge structure. For example, the input sensor IS may have a top bridge structure in which the bridge patterns BP1 are disposed above the sensing patterns SP1, the first portions SP2, and the second portions BP2.

Figure 7A:
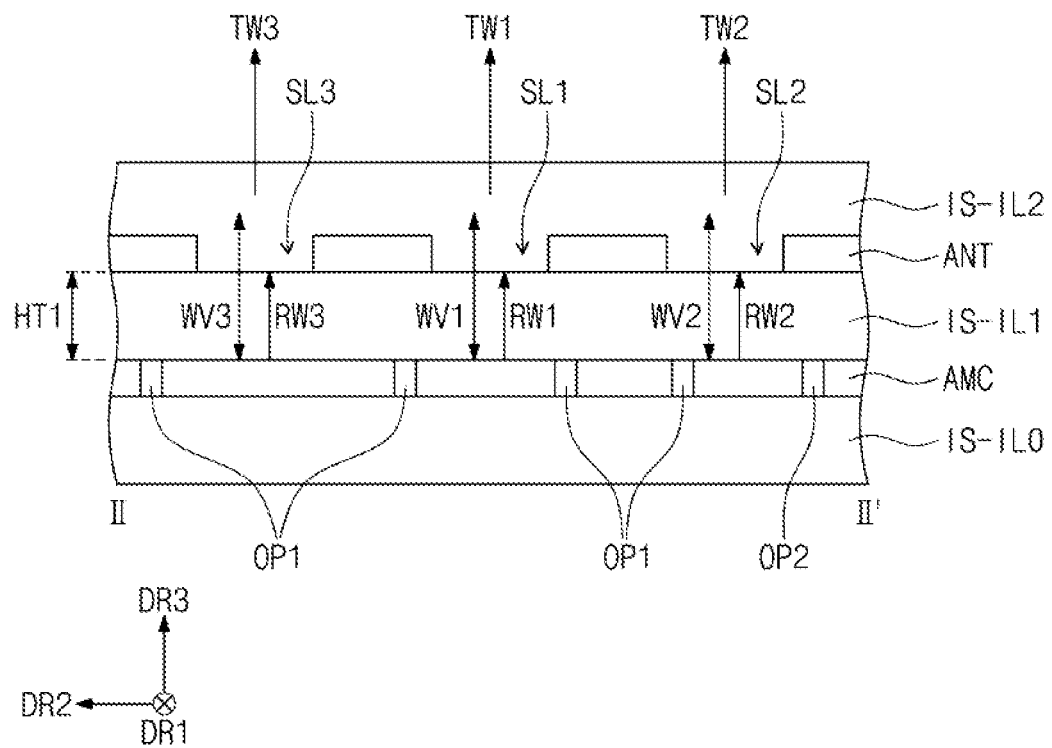
FIG. 7A is a cross-sectional view taken along a line II-II' of FIG. 5 according to an exemplary embodiment of the present disclosure.
Figure 7B:
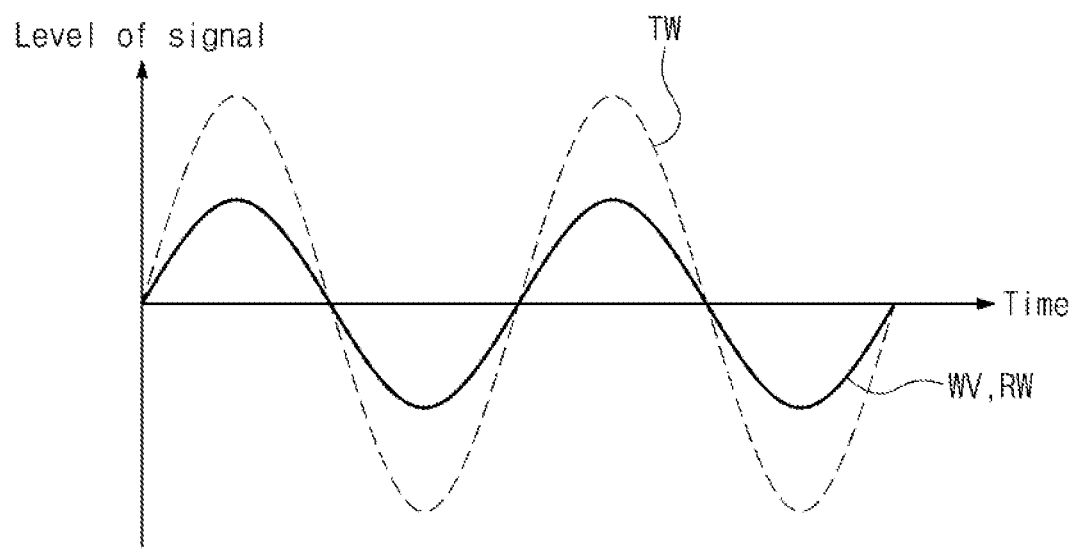
FIG. 7B is a graph showing a signal and a reflection signal according to an exemplary embodiment of the present disclosure.

FIG. 7A is a cross-sectional view taken along a line II-II' of FIG. 5 according to an exemplary embodiment of the present disclosure, and FIG. 7B is a graph showing a signal and a reflection signal according to an exemplary embodiment of the present disclosure. In FIG. 7A, the same reference numerals denote the same elements in FIG. 6, and thus, detailed descriptions of the same elements will be omitted.

Referring to FIGS. 5, 6, 7A, and 7B, the conductive layer AMC may be disposed on the base insulating layer IS-IL0. The first insulating layer IS-IL1 may be disposed on the conductive layer AMC. The antenna element ANT may be disposed on the first insulating layer IS-IL1. The second insulating layer IS-IL2 may be disposed on the first insulating layer IS-IL1 to cover the antenna element ANT.

The antenna element ANT may transmit and/or receive a plurality of signals WV, shown schematically. Electromagnetic fields representing the signal energy of the signals WV may propagate in a wide range of directions from the metallic surfaces of the antenna ANT. The following is a general explanation of how a signal travels in a direction towards the conductive layer AMC, reflects from the reflective surface of the layer AMC and constructively interferes with the same signal traveling in the opposite direction. The signals WV may be understood to travel in a direction substantially parallel to the third direction DR3 (a signal WV travels in each of opposite directions along an axis coinciding with direction DR3). The wireless communication signals may include the signals WV. The signals WV may include a first signal WV1, a second signal WV2, and a third signal WV3.

The signals WV may be reflected by the conductive layer AMC. A plurality of reflected signals RW may be the signals WV that are reflected. The reflected signals RW may travel in the direction substantially parallel to the third direction DR3. The reflected signals RW may include a first reflected signal RW1, a second reflected signal RW2, and a third reflected signal RW3.

The antenna element ANT may transmit and/or receive the first signal WV1 in the first frequency band through the first slot SL1. The first signal WV1 traveling towards the conductive layer AMC may be reflected by the first pattern PT1 of the conductive layer AMC and then combine in phase with signal energy of the first signal WV1 that originally travels in the opposite direction, to produce a composite signal TW1 of (ideally) twice the signal energy (when precisely combined in phase). In other words, the conductive layer AMC may act as a microstrip ground plane to provide the equivalent of a mirror image antenna ANT beneath the conductive layer AMC. The signal energy of the mirror image antenna ANT combines with the signal energy of the antenna ANT to produce the equivalent of a two element array. The first reflected signal RW1 may be the first signal WV1 that is reflected.

The antenna element ANT may transmit and/or receive the second signal WV2 in the second frequency band through the second slot SL2. The antenna element ANT may transmit and/or receive the third signal WV3 in the third frequency band through the third slot SL3. The second and third signals WV2 and WV3 may be reflected by the second pattern PT2 of the conductive layer AMC. The second reflected signal RW2 may be the second signal WV2 that is reflected. The third reflected signal RW3 may be the third signal WV3 that is reflected.

The first signal WV1 may interfere constructively with the first reflected signal RW1 to produce the composite signal TW1. The second signal WV2 may interfere constructively with the second reflected signal RW2 to produce a composite signal TW2. The third signal WV3 may interfere constructively with the third reflected signal RW3 to produce a composite signal TW3.

According to the present disclosure, a phase difference between the signals WV and the reflected signals RW may be about $2n\pi$. In this case, the "n" may be an integer number. The signals WV and the reflected signals RW may have the same phase when combined. The signals WV and the reflected signals RW may constructively interfere with each other and may transmit and/or receive a plurality of constructed signals TW (e.g. TW1, TW2, TW3). The constructed signals TW may have an intensity greater than an intensity of the signals WV and an intensity of the reflected signals RW. The wireless communication signals may include the constructed signals TW. Accordingly, the RF device RFD in which the intensity of the signals is improved and the display device DD having the RF device RFD may be provided.

The first insulating layer IS-IL1 may be referred to as a "dielectric layer IS-IL1". In an example, the first insulating layer IS-IL1 may have a thickness HT1 in the range of about 50-150 micrometers. In general, the dielectric constant and the thickness of the first insulating layer IS-IL1 may be configured to provide the electrical length of $2n\pi$ as discussed above, to optimize the constructive interference of signals at a desired frequency.

When a thickness between the antenna element ANT and a conductive material decreases, a frequency bandwidth at which the antenna element ANT operates may decrease. However, according to the present disclosure, although the thickness between the antenna element ANT and the conductive layer AMC decreases, the conductive layer AMC may reflect the signals WV emitted from the antenna element ANT to form the reflected signals RW, and the signals WV and the reflected signals RW may constructively interfere with each other to form the constructed signals TW having improved intensity. The constructed signals TW may increase the frequency bandwidth so that the RF device RFD may enable the broadband communication. Accordingly, the RF device RFD whose thickness decreases and communication efficiency is improved and the display device DD having the RF device RFD may be provided.

The RF device RFD may further include a ground electrode disposed under the base insulating layer IS-IL0. In this case, the base insulating layer IS-IL0 may have a thickness in the range of about 50-150 micrometers.

When the thickness of a material between the antenna element ANT and a conductive material decreases, the frequency bandwidth at which the antenna element ANT operates may decrease. However, according to the present disclosure, although the thickness between the antenna element ANT and the ground electrode decreases, the conductive layer AMC may reflect the signals WV emitted from the antenna element ANT to form the reflected signals RW, and the signals WV and the reflected signals RW may constructively interfere with each other to form the constructed signals TW having improved intensity. The frequency bandwidth at which the RF device RFD enables the communication may increase due to the constructed signals TW. Accordingly, the RF device RFD having the decreased thickness and the improved communication efficiency and the display device DD having the RF device RFD may be provided.

It is noted here that the cross section of FIG. 7A along the lines II-II' includes openings OP1 and OP2 in the conductive layer AMC, which are discussed below. Openings such as OP1 and OP2 serve to increase the frequency bandwidth of the antenna elements ANT.

Figure 8A:
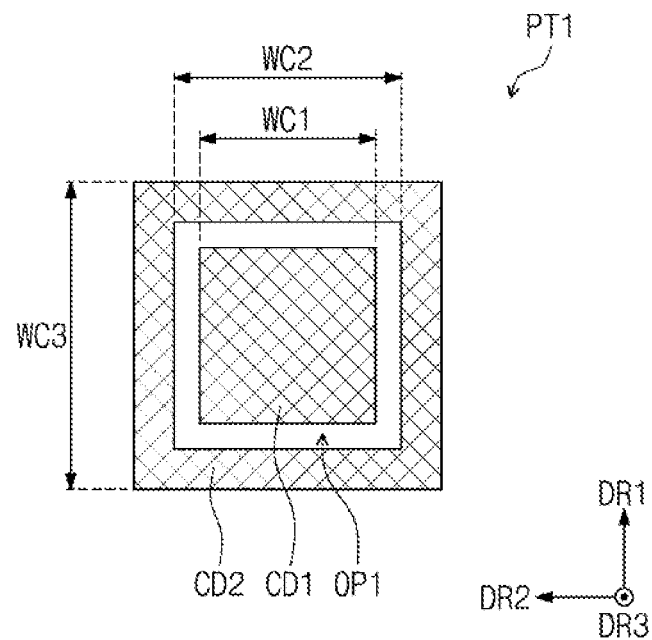
FIG. 8A is a plan view showing a first pattern according to an exemplary embodiment of the present disclosure.
Figure 8B:
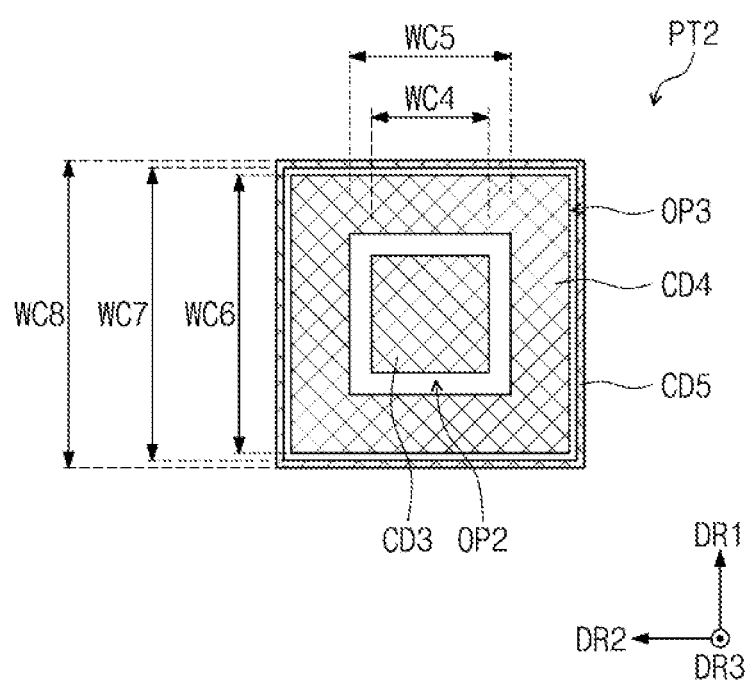
FIG. 8B is a plan view showing a second pattern according to an exemplary embodiment of the present disclosure.

FIG. 8A is a plan view showing the first pattern ("first conductive structure") PT1 according to an exemplary embodiment of the present disclosure, and FIG. 8B is a plan view showing the second pattern ("second conductive structure") PT2 according to an exemplary embodiment of the present disclosure.

Referring collectively to FIGS. 7A, 7B, 8A and 8B, the first signal WV1 reflected by the first pattern PT1 may be referred to as the first reflected signal RW1. The first reflected signal RW1 may constructively interfere with the first signal WV1.

The first pattern PT1 may have a square shape. For example, the first pattern PT1 may have the square shape whose one side has a length of about 2.1 mm. The first pattern PT1 may include a first sub-pattern CD1 and a second sub-pattern CD2. Each of the first sub-pattern CD1 and the second sub-pattern CD2 may have a mesh structure.

The first sub-pattern CD1 may have a square shape. A side of the square shape may have a first length WC1. For example, the first length WC1 may be about 1.2 mm. The first sub-pattern CD1 may include a carbon nanotube, a metal material, a metal alloy, or composites thereof and may have a single-layer structure or a multi-layer structure in which titanium (Ti), aluminum (Al), and titanium (Ti) are sequentially stacked. For example, the metal material may be silver (Ag), copper (Cu), aluminum (Al), gold (Au), or platinum (Pt). The first sub-pattern CD1 may be a pattern that does not exert influence on a resonance of the first frequency band at which the first slot SL1 (refer to FIG. 5) operates, and the first sub-pattern CD1 may be provided to reduce a Moiré phenomenon.

The second sub-pattern CD2 may surround the first sub-pattern CD1. The second sub-pattern CD2 may have a quadrangular ring shape. An inner side of the quadrangular ring may have a second length WC2, and an outer side of the quadrangular ring may have a third length WC3. For example, the second length WC2 may be in a range from about 1.5 mm to about 1.7 mm, and the second length WC2 may be about 1.55 mm. The third length WC3 may be about 2.1 mm. The second sub-pattern CD2 may include the same material as that of the first sub-pattern CD1.

The first pattern PT1 may be provided with one opening defined therethrough. A first opening OP1 may be defined between the first sub-pattern CD1 and the second sub-pattern CD2 of the first pattern PT1. The first opening OP1 may surround the first sub-pattern CD1. The first opening OP1 may have a quadrangular ring shape.

The second signal WV2 and the third signal WV3, which are reflected by the second pattern PT2, may be respectively referred to as the second reflected signal RW2 and the third reflected signal RW3. The second reflected signal RW2 may constructively interfere with the second signal WV2. The third reflected signal RW3 may constructively interfere with the third signal WV3.

The second pattern PT2 may have a square shape. The second pattern PT2 may have the same size as the size of the first pattern PT1. A length of an outer side of the first pattern PT1 may be the same as a length of an outer side of the second pattern PT2. For example, the second pattern PT2 may have a square shape whose one side has a length of about 2.1 mm. The second pattern PT2 may include a third sub-pattern CD3, a fourth sub-pattern CD4, and a fifth sub-pattern CD5. Each of the third sub-pattern CD3, the fourth sub-pattern CD4, and the fifth sub-pattern CD5 may have a mesh structure composed of a conductive material as described above for layer.

The third sub-pattern CD3 may have a square shape. A side of the square shape may have a fourth length WC4. For example, the fourth length WC4 may be about 0.8 mm. The third sub-pattern CD3 may include the same material as the first sub-pattern CD1. The third sub-pattern CD3 may be a pattern that does not exert influence on a second frequency band at which the second slot SL2 (refer to FIG. 5) operates and a third frequency band at which the third slot SL3 (refer to FIG. 5) operates, and the third sub-pattern CD3 may be provided to reduce the Moiré phenomenon.

According to the present disclosure, the first length WC1 of the first sub-pattern CD1 and the fourth length WC4 of the third sub-pattern CD3 may be different from each other. A size of the first sub-pattern CD1 may be different from a size of the third sub-pattern CD3. There is a difference in shape between the first pattern PT1 and the second pattern PT2 due to the first sub-pattern CD1 and the third sub-pattern CD3. The Moiré phenomenon that occurs when patterns of the same shape are repeatedly arranged may be reduced or prevented by the first pattern PT1 and the second pattern PT2 having different shapes.

The fourth sub-pattern CD4 may surround the third sub-pattern CD3. The fourth sub-pattern CD4 may have a quadrangular ring shape. An inner side of the quadrangular ring may have a fifth length WC5, and an outer side of the quadrangular ring may have a sixth length WC6. For example, the fifth length WC5 may be about 1.1 mm, and the sixth length WC6 may be about 1.9 mm. The fourth sub-pattern CD4 may include the same material as that of the third sub-pattern CD3.

The fifth sub-pattern CD5 may surround the fourth sub-pattern CD4. The fifth sub-pattern CD5 may have a quadrangular ring shape. An inner side of the quadrangular ring may have a seventh length WC7, and an outer side of the quadrangular ring may have an eighth length WC8. For example, the seventh length WC7 may be about 2 mm, and the eighth length WC8 may be about 2.1 mm. The fifth sub-pattern CD5 may include the same material as that of the fourth sub-pattern CD4.

The second pattern PT2 may be provided with two openings defined therethrough. A second opening OP2 may be defined between the third sub-pattern CD3 and the fourth sub-pattern CD4 of the second pattern PT2. The second opening OP2 may surround the third sub-pattern CD3. The second opening OP2 may have a quadrangular ring shape.

A third opening OP3 may be defined between the fourth sub-pattern CD4 and the fifth sub-pattern CD5 of the second pattern PT2. The third opening OP3 may surround the fourth sub-pattern CD4. The third opening OP3 may have a quadrangular ring shape.

A length of one side defining the first opening OP1 may be greater than a length of one side defining the second opening OP2 and may be smaller than a length of one side defining the third opening OP3.

A first area of the first opening OP1 may be greater than a second area of the second opening OP2. The second area of the second opening OP2 may be greater than a third area of the third opening OP3.

The first sub-pattern CD1 may have an area greater than an area of the third sub-pattern CD3.

The first pattern PT1 and the second pattern PT2 may reflect the signals WV incident thereto, and the signals WV and the reflected signals RW may constructively interfere with each other.

Figure 9:
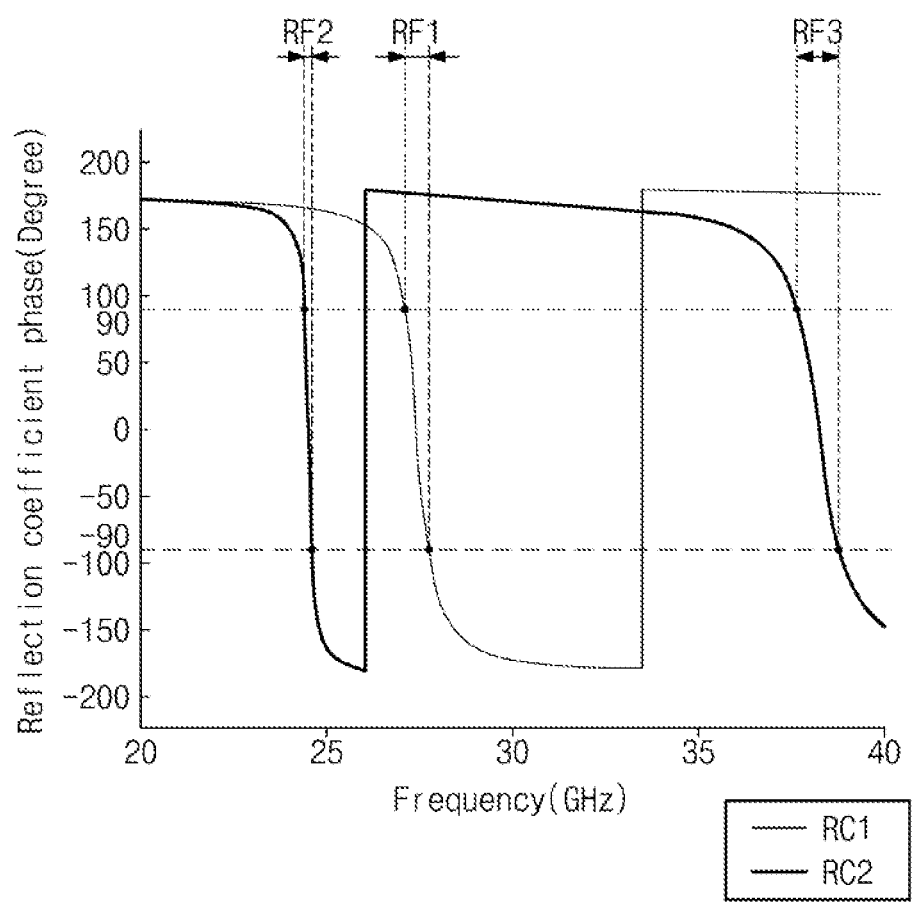
FIG. 9 is a graph showing a phase of reflection coefficient depending on frequencies of signals respectively reflected by the first pattern and the second pattern according to an exemplary embodiment of the present disclosure.

FIG. 9 is a graph showing a phase of reflection coefficient (hereinafter, referred to as a "reflection coefficient phase") depending on frequencies of signals respectively reflected by the first pattern and the second pattern according to an exemplary embodiment of the present disclosure.

Referring to FIGS. 8A, 8B, and 9, when a first signal that is incident is reflected by the first pattern PT1 and the second pattern PT2, the reflection coefficient phase shows a variation in phase between the incident first signal and a second signal that corresponds to a reflected signal of the first signal. The reflection coefficient phase of the first pattern PT1 is represented by a first graph RC1, and the reflection coefficient phase of the second pattern PT2 is represented by a second graph RC2.

The first graph RC1 of the first pattern PT1 may vary in a first reflection frequency band RF1. The first reflection frequency band RF1 may be a section in which the first graph RC1 is changed from about 90° to about −90°. For example, the first graph RC1 may include zero (0) in the first reflection frequency band RF1. The first reflection frequency band RF1 may include the first frequency band at which the first slot SL1 of the antenna element ANT resonates. For example, the first reflection frequency band RF1 may be in a range from about 27.5 GHz to about 28.35 GHz and may include about 28 GHz. The first pattern PT1 may reflect the signal incident thereto at the first reflection frequency band RF1 due to the first opening OP1.

The second graph RC2 of the second pattern PT2 may vary in a second reflection frequency band RF2 and a third reflection frequency band RF3. The second reflection frequency band RF2 may be a section in which the second graph RC2 is changed from about 90° to about −90°. For example, the second graph RC2 may include zero (0) in the second reflection frequency band RF2. That is, the second reflection frequency band RF2 may include the second frequency band at which the second slot SL2 of the antenna element ANT resonates. For example, the second reflection frequency band RF2 may be in a range from about 24 GHz to about 25.25 GHz and may include about 24 GHz. The second pattern PT2 may reflect the signal incident thereto at the second reflection frequency band RF2 due to the third opening OP3.

The third reflection frequency band RF3 may be a section in which the second graph RC2 is changed from about 90° to about −90°. For example, the second graph RC2 may include zero (0) in the third reflection frequency band RF3. That is, the third reflection frequency band RF3 may include the third frequency band at which the third slot SL3 of the antenna element ANT resonates. For example, the third reflection frequency band RF3 may be in a range from about 37 GHz to about 40 GHz and may include about 39 GHz. The second pattern PT2 may reflect the signal incident thereto at the third reflection frequency band RF3 due to the second opening OP2.

Each of the first graph RC1 and the second graph RC2 may be determined depending on a relative size between the sub-patterns CD1, CD2, CD3, CD4, and CD5 and the openings OP1, OP2, and OP3. For example, the first reflection frequency band RF1 may be determined by the shape of the first pattern PT1, and the second reflection frequency band RF2 and the third reflection frequency band RF3 may be determined by the shape of the second pattern PT2.

Figure 10:
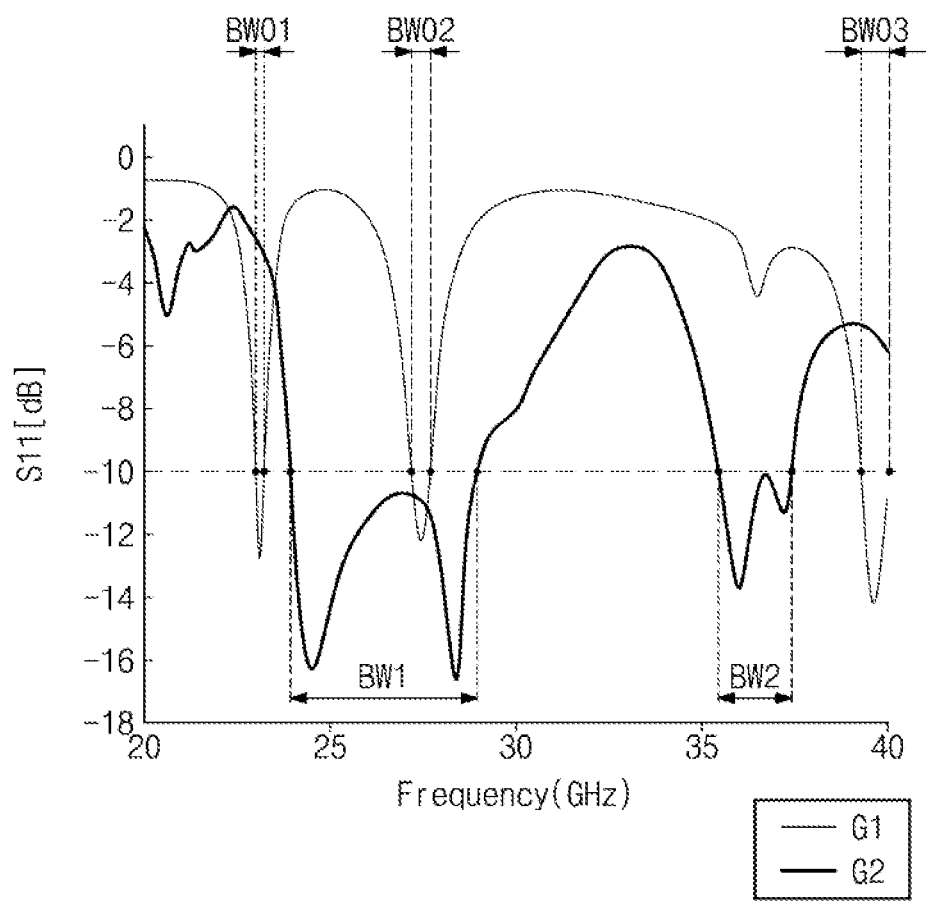
FIG. 10 is a graph showing an S-parameter according to a frequency with respect to presence or absence of a conductive layer of a radio frequency device according to an exemplary embodiment of the present disclosure.

FIG. 10 is a graph showing an S-parameter according to a frequency with respect to presence or absence of a conductive layer of a RF device according to an exemplary embodiment of the present disclosure.

Referring to FIGS. 5 and 10, S11 may be one of S-parameters. S11 may be a value representing a ratio of a level of an input signal to a level of a signal corresponding to the reflected input signal. For example, S11 may be a reflection coefficient of the RF device RFD. A case in which S11 has a value of about −10 dB may be used as a reference to determine whether the RF device RFD operates. The value of "about −10 dB" may indicate a case when the level of the signal corresponding to the reflected input signal is about 10% of the level of the input signal. When S11 is smaller than about −10 dB, it may be determined that the RF device RFD (refer to FIG. 2) operates in a corresponding frequency band.

In a case of a RF device that is provided without the conductive layer AMC, the S-parameter of the RF device may have a shape of a first graph G1. Referring to the first graph G1, a bandwidth of each of frequency bands BW01, BW02, and BW03 in which the RF device operates may be a narrow band. However, according to the present disclosure, the RF device RFD may include the conductive layer AMC, and the S-parameter of the RF device RFD may have a shape of a second graph G2. Referring to the second graph G2, the signal WV (refer to FIG. 7B) emitted by the antenna element ANT may constructively interfere with the reflected signal RW (refer to FIG. 7B) reflected from the conductive layer AMC. The RF device RFD may emit the signal having the improved intensity, and a bandwidth of each of frequency bands BW1 and BW2 at which the RF device RFD operates may be enhanced. The frequency bands BW1 and BW2 of the second graph G2 may be a broadband. The frequency bands BW1 and BW2 may include a first frequency band BW1 and a second frequency band BW2. The first frequency band BW1 may be in a range from about 24 GHz to about 29 GHz and may include about 24 GHz and about 28 GHz. The second frequency band BW2 may be in a range from about 35.5 GHz to about 37 GHz and may include about 37 GHz. Accordingly, the RF device RFD having the improved frequency bandwidth and the display device DD having the RF device RFD may be provided.

Figure 11A:
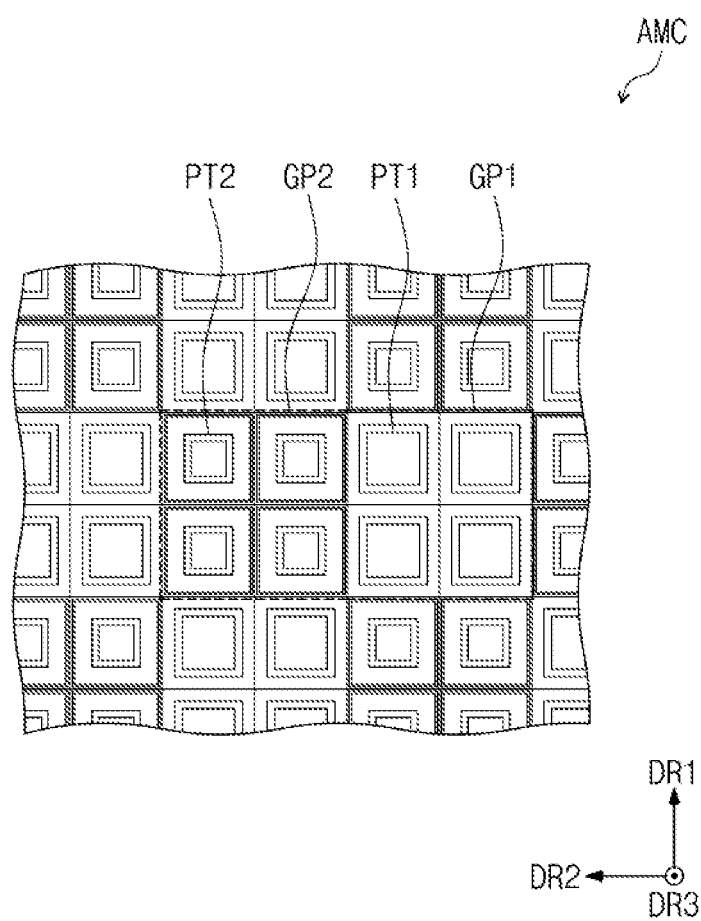
FIG. 11A is a plan view showing a conductive layer according to an exemplary embodiment of the present disclosure.
Figure 11B:
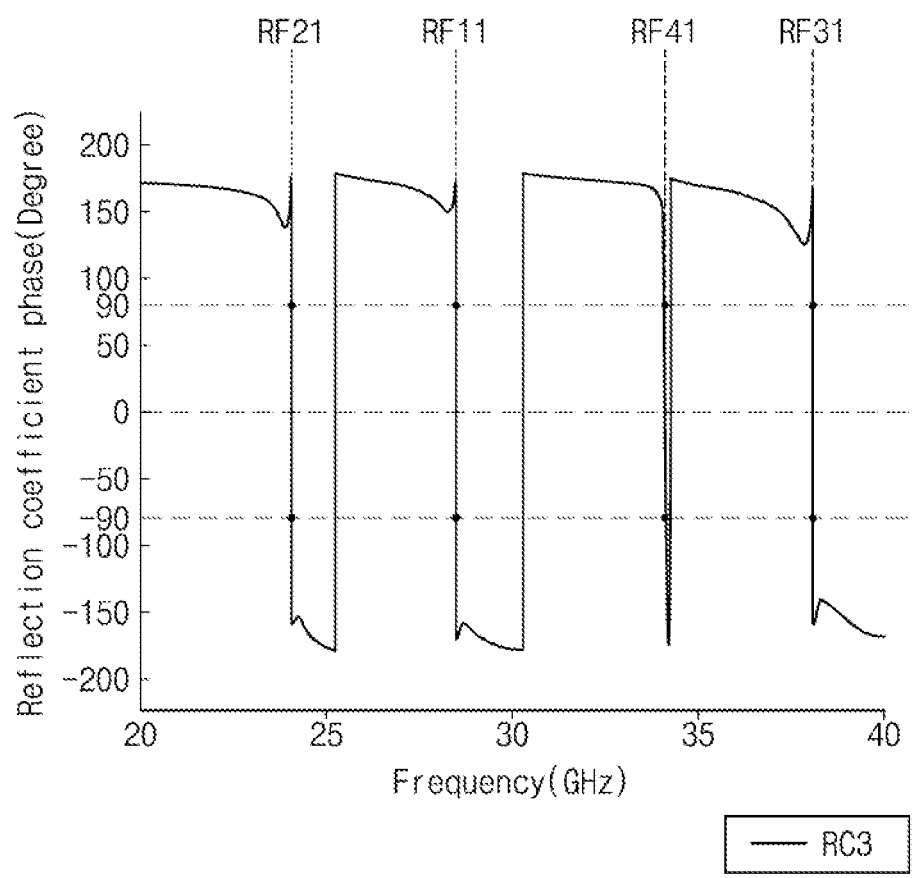
FIG. 11B is a graph showing a phase of reflection coefficient depending on frequencies of signals reflected by a conductive layer according to an exemplary embodiment of the present disclosure.
Figure 11C:
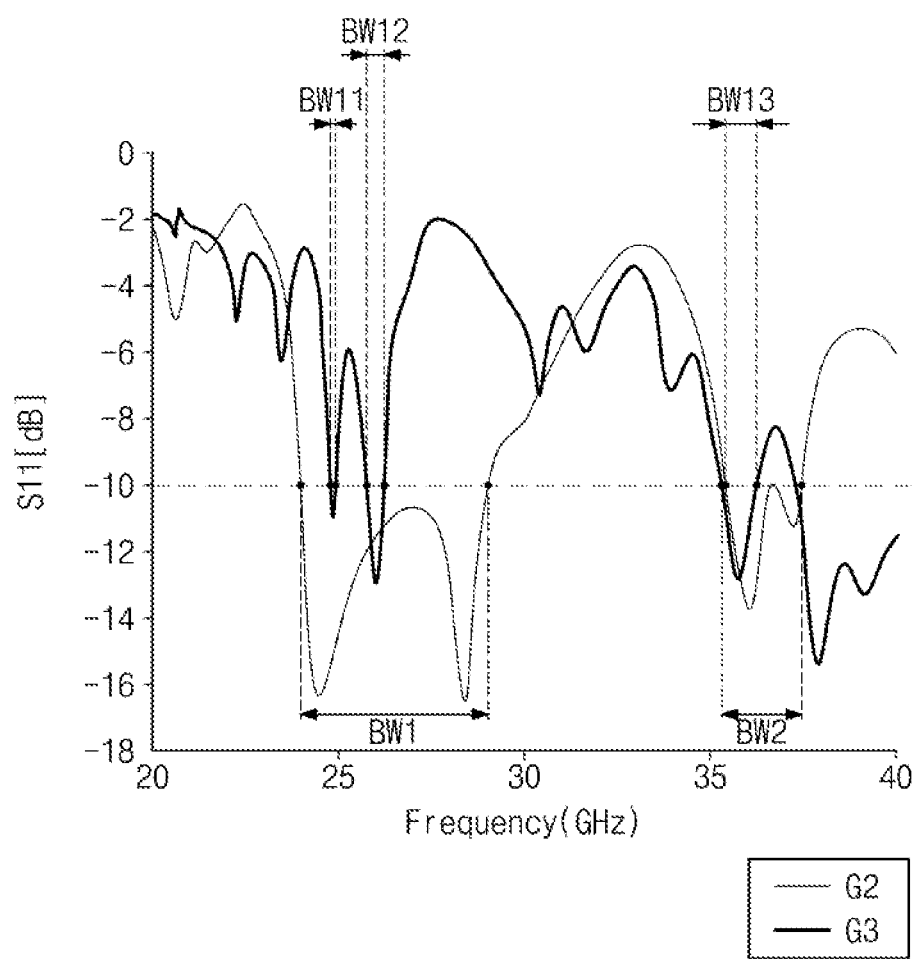
FIG. 11C is a graph showing an S-parameter according to a frequency with respect to a pattern shape of a conductive layer of a radio frequency device according to an exemplary embodiment of the present disclosure.

FIG. 11A is a plan view showing the conductive layer AMC according to an exemplary embodiment of the present disclosure, FIG. 11B is a graph showing a reflection coefficient phase depending on frequencies of signals reflected by the conductive layer according to an exemplary embodiment of the present disclosure, and FIG. 11C is a graph showing an S-parameter according to a frequency with respect to a pattern shape of a conductive layer of a RF device according to an exemplary embodiment of the present disclosure.

Referring to FIGS. 11A, 11B, and 11C, the first groups GP1 and the second groups GP2 may be defined in the conductive layer AMC. The first groups GP1 may be alternately arranged with the second groups GP2. For example, the second groups GP2 may be disposed adjacent to one first group GP1 in the first direction DR1 and the second direction DR2, and the first groups GP1 may be disposed adjacent to one second group GP2 in the first direction DR1 and the second direction DR2.

Each of the first groups GP1 may include four first patterns PT1 arranged in two-by-two array. Each of the second groups GP2 may include four second patterns PT2 arranged in two-by-two array.

When viewed in a plane, the first groups GP1 and the second groups GP2 may have a periodicity.

The reflection coefficient phase shows a variation in phase between a first signal that is incident and a second signal that corresponds to a reflected signal of the first signal when the first signal is reflected by the conductive layer AMC having the periodicity. The reflection coefficient phase in the conductive layer AMC may be represented by a third graph RC3.

The third graph RC3 of the conductive layer AMC may vary in reflection frequency bands RF11, RF12, RF13, and RF14. The reflection frequency bands RF11, RF12, RF13, and RF14 may be a section in which the third graph RC3 is changed from about 90° to about −90°. For example, the third graph RC3 may include zero (0) in the reflection frequency bands RF11, RF12, RF13, and RF14. The reflection frequency bands RF11, RF12, RF13, and RF14 may include the first frequency band at which the first slot SL1 (refer to FIG. 5) operates, the second frequency band at which the second slot SL2 (refer to FIG. 5) operates, and the third frequency band at which the third slot SL3 (refer to FIG. 5) operates. For example, the reflection frequency bands RF11, RF12, RF13, and RF14 may include about 24 GHz, about 28 GHz, and about 39 GHz.

When the RF device is configured by disposing the conductive layer having no periodicity under the antenna layer AN (refer to FIG. 2), the S-parameter of the RF device may have a shape of the third graph RC3. Referring to third graph G3, in the RF device, the frequency band enhancement effect may be reduced and unnecessary resonance may occur due to the conductive layer having no periodicity. The frequency bands BW11, BW12, and BW13 at which the RF device operates may be the narrow band. However, according to the present disclosure, the RF device RFD (refer to FIG. 2) may include the conductive layer AMC having the periodicity, and the S-parameter of the RF device RFD (refer to FIG. 2) may have the shape of the second graph G2. Referring to the second graph G2, the signal WV (refer to FIG. 7B) emitted by the antenna element ANT may constructively interfere with the reflected signal RW (refer to FIG. 7B) reflected from the conductive layer AMC. The RF device RFD (refer to FIG. 2) may emit the signal with the improved intensity, and the bandwidth of each of the frequency bands BW1 and BW2 at which the RF device RFD (refer to FIG. 2) operates may be the broadband. Accordingly, the RF device RFD (refer to FIG. 2) with enhanced frequency bandwidth that enables the broadband communication and the display device DD (refer to FIG. 1) having the RF device RFD (refer to FIG. 2) may be provided.

Figure 12:
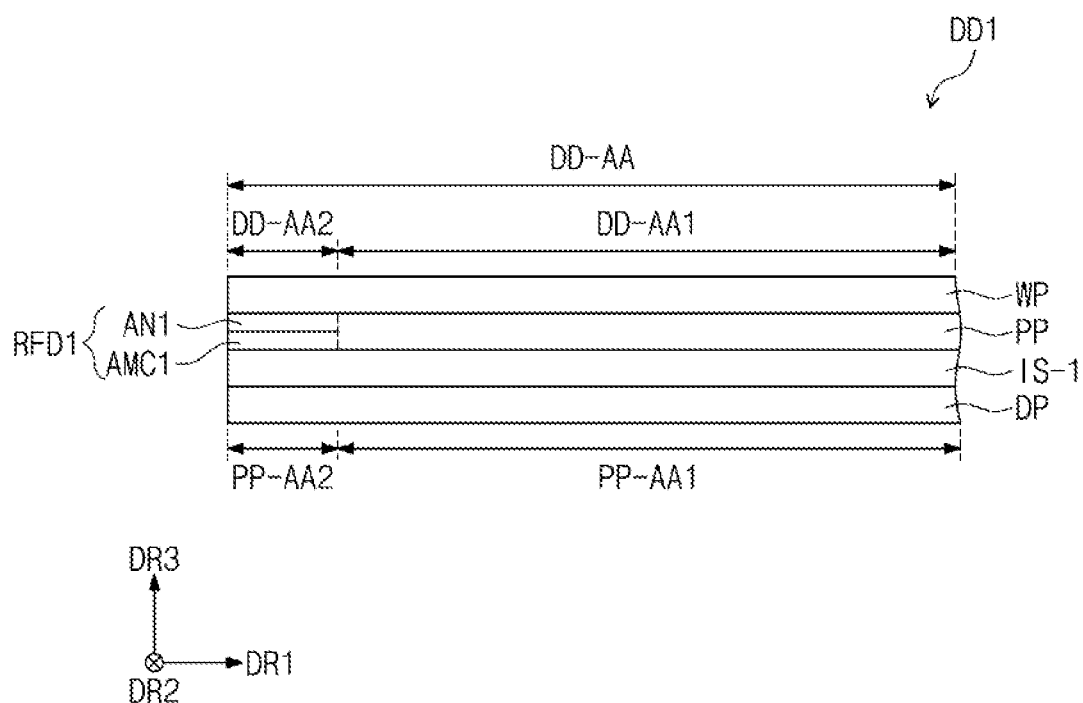
FIG. 12 is a cross-sectional view showing a display device according to an exemplary embodiment of the present disclosure.

FIG. 12 is a cross-sectional view showing a structure of a display device DD1 according to an exemplary embodiment of the present disclosure. In FIG. 12, the same reference numerals denote the same elements in FIG. 2, and thus, detailed descriptions of the same elements will be omitted.

Referring to FIG. 12, an input sensor IS-1 may be disposed on a display panel DP. The input sensor IS-1 may sense an external input applied thereto from the exterior. The input sensor IS-1 may include a plurality of sensing electrodes TE1 and TE2 with the same or similar characteristics as described in connection with FIG. 4 above, but in a lower layer relative to that of an RF device RFD1.

A pattern portion PP may be disposed on the input sensor IS-1. The pattern portion PP may include a first active area PP-AA1 and a second active area PP-AA2 extending from one side of the first active area PP-AA1, which are defined therein. The first active area PP-AA1 may correspond to a first active area DD-AA1 of the display device DD1. The second active area PP-AA2 may correspond to a second active area DD-AA2 of the display device DD2.

The pattern portion PP may include the RF device RFD1. When viewed in a plane, the RF device RFD1 may overlap the second active area PP-AA2. The RF device RFD1 may include an antenna layer AN1 and a conductive layer AMC1 disposed under the antenna layer AN1. The conductive layer AMC1 may be disposed on the input sensor IS-1.

Figure 13:
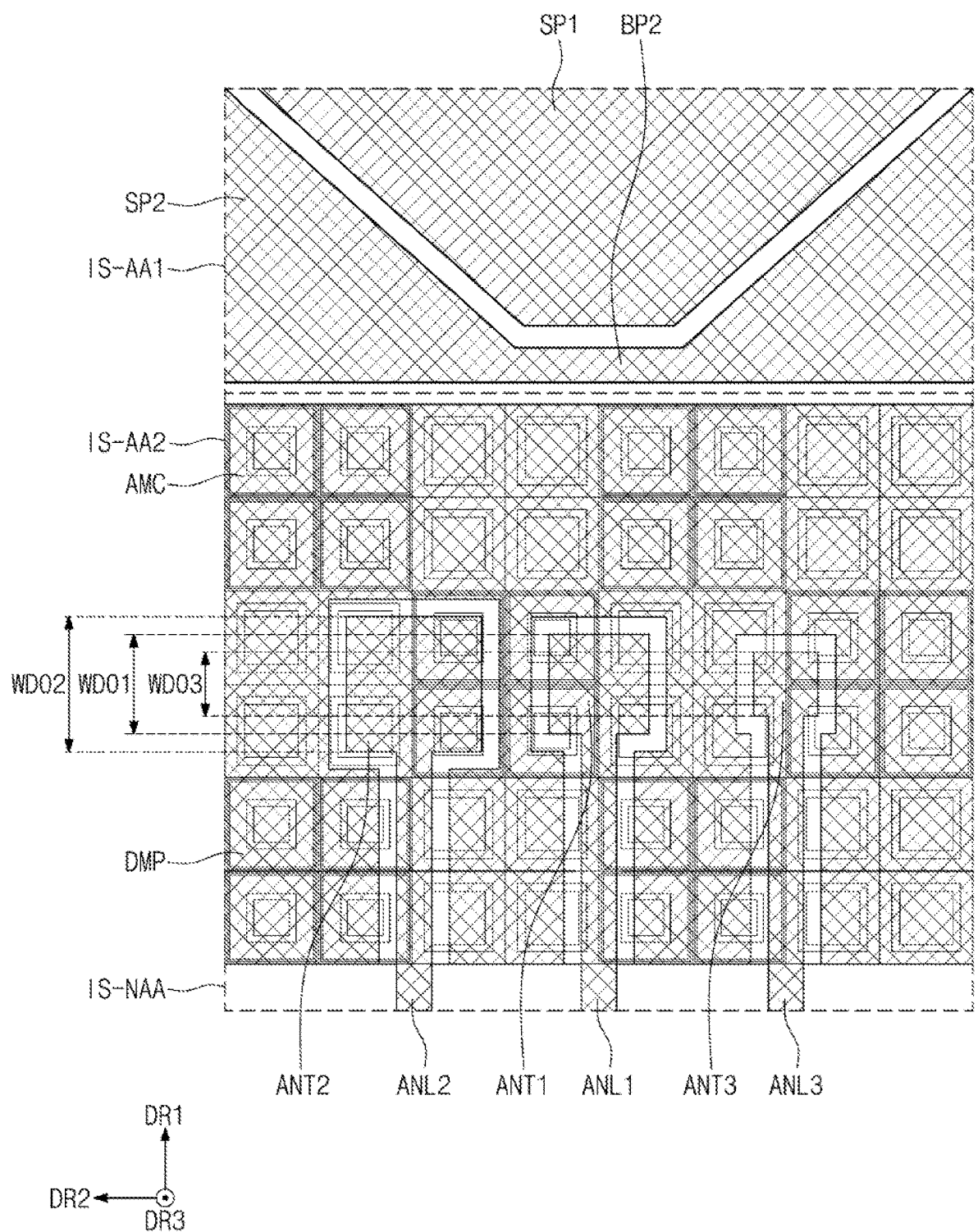
FIG. 13 is an enlarged plan view showing an area corresponding to an area AA' of FIG. 4 according to an exemplary embodiment of the present disclosure.

FIG. 13 is an enlarged plan view showing an area corresponding to an area AA' of FIG. 4, for the display device DD1 with the vertical structure of FIG. 2 or 12, according to an exemplary embodiment of the present disclosure. In FIG. 13, the same reference numerals denote the same elements in FIG. 5A, and thus, detailed descriptions of the same elements will be omitted.

Referring to FIG. 13, a first antenna element ANT1 may operate in a first frequency band. A second antenna element ANT2 may operate in a second frequency band. A third antenna element ANT3 may operate in a third frequency band.

The first antenna element ANT1, the second antenna element ANT2, and the third antenna element ANT3 may be patch antennas.

The third frequency band may be higher than the first frequency band. The first frequency band may be higher than the second frequency band. The first frequency band may include a first resonant frequency. For example, the first resonant frequency may be about 28 GHz. The second frequency band may include a second resonant frequency. For example, the second resonant frequency may be about 24 GHz. The third frequency band may include a third resonant frequency. For example, the third resonant frequency may be about 39 GHz. However, these frequencies are merely exemplary, since the antennas ANT1-ANT3 may be sized for optimum operation at any suitable frequency of the signal to be communicated.

The widths of patch antennas (in a direction aligned with an end-fed feed line) may be inversely proportional to the frequency of operation. Thus, in FIG. 13, the longer the width in the direction DR1, the lower the resonant frequency of the patch. For example, the width of a patch may be approximately equal to ½ the wavelength (within the dielectric substrate IS-IL1) at the resonant frequency of the patch. As illustrated, the first antenna element ANT1 may have a first width WD01 in the first direction DR1, which is determinative of the first resonant frequency. The second antenna element ANT2 may have a second, larger width WD02 in the first direction DR1, which is determinative of the second resonant frequency lower than the first resonant frequency. The third antenna element ANT3 may have a third width WD03 (smaller than first width WD01) in the first direction DR1, which is determinative of the third resonant frequency (higher than the first resonant frequency).

The first, second and third antenna elements ANT1, ANT2 and ANT3 may be separately fed from first, second and third antenna feed lines ANL1, ANL2 and ANL3, respectively. In the illustrated example, the antenna elements ANT1-ANT3 are "end-fed" by the respective antenna feed lines ANL1-ANL3. Alternatively, a pair of slits may be provided within the patch conductive material on opposite sides of the feed lines so that the antenna elements ANT1-ANT3 are each "inset fed". In still another alternative, the antenna elements ANT1-ANT3 are each fed by a microstrip probe feed at a feed point within the patch mesh.

With the antenna configuration of FIG. 13, the conductive layer AMC may serve as a ground plane for the patch antenna elements ANT1-ANT3, and may have sub-patterns having different shapes from each other, as illustrated. Accordingly, a Moiré phenomenon that occurs when patterns of the same shape are repeatedly arranged is prevented. Thus, a visibility of the image displayed through the display device is improved (particularly, in the region of the antenna elements ANT1-ANT3).

According to the embodiment of FIG. 13, the RF device RFD/RFD1 may include the conductive layer AMC, such that a signal WV (refer to FIG. 7B) emitted from the first antenna element ANT1, the second antenna element ANT2, and the third antenna element ANT3 may constructively interfere with a reflected signal RW reflected by the conductive layer AMC, in a similar manner as described above in reference to FIG. 7B. The RF device RFD/RFD1 may thereby emit the signal with improved intensity. Further, a bandwidth of each of the first, second and third frequency bands at which the RF device RFD/RFD1 operates may be enhanced due to the presence of the slots OP1-OP3. Accordingly, the RF device RFD/RFD1 with an enhanced frequency bandwidth that enables broadband communication, and the display device DD including the RF device RFD compactly integrated therein may be provided.

In other embodiments of the present disclosure, the RF device RFD/RFD1 is provided as a stand-alone RF device, or is a part of another electronic device that lacks a display. Such an RF device may exhibit the advantage of achieving multi-band operation with less complexity, e.g., with a smaller number of antenna feed lines.

Although the exemplary embodiments of the present disclosure have been described, it is understood that the present disclosure should not be limited to these exemplary embodiments but various changes and modifications can be made by one ordinary skilled in the art within the spirit and scope of the present disclosure as hereinafter claimed. Therefore, the disclosed subject matter should not be limited to the embodiments described herein, and the scope of the present inventive concept shall be determined according to the attached claims.

What is claimed is:
1. A display device comprising:
a display panel having an active area for projecting an image;
a conductive layer disposed on the active area and comprising a plurality of first patterns and a plurality of second patterns each having a shape different from each of the plurality of first patterns; and
an antenna element spaced from the conductive layer and operating in each of a first frequency band and a second frequency band, wherein a first signal within the first frequency band constructively interferes with a first reflected signal corresponding to the first signal reflected at least partially by the plurality of first patterns, and a second signal within the second frequency band constructively interferes with a second reflected signal corresponding to the second signal reflected at least partially by the plurality of second patterns.

2. The display device of claim 1, wherein the conductive layer comprises a plurality of first groups and a plurality of second groups alternately arranged with the plurality of first groups and defined therein, each of the plurality of first groups comprises the plurality of first patterns arranged in two-by-two array, and each of the plurality of second groups comprises the plurality of second patterns arranged in two-by-two array.

3. The display device of claim 1, wherein each of the plurality of first patterns comprises a first sub-pattern and a second sub-pattern surrounding the first sub-pattern, a first opening is defined between the first sub-pattern and the second sub-pattern to surround the first sub-pattern, each of the plurality of second patterns comprises a third sub-pattern, a fourth sub-pattern surrounding the third sub-pattern, and a fifth sub-pattern surrounding the fourth sub-pattern, a second opening is defined between the third sub-pattern and the fourth sub-pattern to surround the third sub-pattern, and a third opening is defined between the fourth sub-pattern and the fifth sub-pattern to surround the fourth sub-pattern.

4. The display device of claim 3, wherein the first sub-pattern and the third sub-pattern have a square shape, and the second sub-pattern, the fourth sub-pattern, and the fifth sub-pattern have a quadrangular ring shape.

5. The display device of claim 3, wherein the first opening has a first size greater than a second size of the second opening, and the second size is greater than a third size of the third opening.

6. The display device of claim 3, wherein the first sub-pattern has a size greater than a size of the third sub-pattern.

7. The display device of claim 1, wherein each of the plurality of first patterns has a same size as a size of each of the plurality of second patterns.

8. The display device of claim 1, wherein each of the plurality of first patterns is provided with one opening defined therein, and each of the plurality of second patterns is provided with two openings defined therein.

9. The display device of claim 1, wherein a difference in phase between a signal incident in the first frequency band and a signal reflected from each of the plurality of first patterns is zero (0), and a difference in phase between a signal incident in the second frequency band and a signal reflected from each of the plurality of second patterns is zero (0).

10. The display device of claim 1, wherein the antenna element comprises a first slot defined therein and operating in the first frequency band and a second slot defined therein and operating in the second frequency band, the first frequency band is higher than the second frequency band, and the first slot has a width smaller than a width of the second slot.

11. The display device of claim 10, wherein the antenna element further comprises a third slot defined therein, operating in a third frequency band higher than the first frequency band and the second frequency band, and having a width smaller than the width of the first slot, and a third signal comprising the third frequency band constructively interferes with a third reflected signal corresponding to the third signal reflected by the plurality of second patterns.

12. The display device of claim 1, wherein the antenna element, the plurality of first patterns, and the plurality of second patterns have a mesh structure.

13. The display device of claim 1, further comprising an input sensing unit disposed on the display panel and comprising a plurality of sensing electrodes, wherein the antenna element is disposed on a same layer as some portions among the plurality of sensing electrodes, and the conductive layer is disposed on a same layer as the other portions among the plurality of sensing electrodes.

14. The display device of claim 1, further comprising an input sensing unit disposed on the display panel and comprising a plurality of sensing electrodes, wherein the conductive layer is disposed on the input sensing unit.

15. A radio frequency (RF) device comprising:
a base layer;
a conductive layer disposed on the base layer and comprising a plurality of first groups of conductive structures and a plurality of second groups of conductive structures having a different shape from the plurality of first groups and alternately arranged with the plurality of first groups;
a dielectric layer disposed on the conductive layer; and
at least one antenna element disposed on the dielectric layer and operating in each of a first frequency band and a second frequency band.

16. The radio frequency device of claim 15, wherein a first signal comprising the first frequency band constructively interferes with a first reflected signal corresponding to the first signal reflected by the plurality of first groups, and a second signal comprising the second frequency band constructively interferes with a second reflected signal corresponding to the second signal reflected by the plurality of second groups.

17. The radio frequency device of claim 15, wherein each of the plurality of first groups comprises four first patterns arranged in two-by-two array, and each of the plurality of second groups comprises four second patterns arranged in two-by-two array.

18. The radio frequency device of claim 17, wherein each of the four first patterns comprises a first sub-pattern and a second sub-pattern surrounding the first sub-pattern, a first opening is defined between the first sub-pattern and the second sub-pattern to surround the first sub-pattern, each of the four second patterns comprises a third sub-pattern, a fourth sub-pattern surrounding the third sub-pattern, and a fifth sub-pattern surrounding the fourth sub-pattern, a second opening is defined between the third sub-pattern and the fourth sub-pattern to surround the third sub-pattern, and a third opening is defined between the fourth sub-pattern and the fifth sub-pattern to surround the fourth sub-pattern.

19. The radio frequency device of claim 18, wherein a length of one side defining the first opening is greater than a length of one side defining the second opening and is smaller than a length of one side defining the third opening.

20. The radio frequency device of claim 15, wherein the dielectric layer has a thickness equal to or greater than about 50 micrometers and equal to or smaller than about 150 micrometers.

21. The radio frequency device of claim 15, wherein the at least one antenna element comprises a first antenna element resonating only in the first frequency band and a second antenna element resonating only in the second frequency band.

22. The RF antenna of claim 15, wherein, in any plan view of the conductive layer, each of the conductive structures of the plurality of first groups of conductive structures is non-overlapping with each of the conductive structures of the plurality of second groups of conductive structures.

23. A radio frequency (RF) antenna comprising:
a base layer;
a ground plane layer disposed on the base layer and comprising a plurality of first slots in a first configuration and a plurality of second slots in a second configuration different from the first configuration, the plurality of first slots being interspersed with the plurality of second slots;

a dielectric layer disposed on the ground plane layer; and at least one microstrip patch antenna element disposed on the dielectric layer, the microstrip patch antenna element comprising a plurality of slots enabling the antenna element to resonate at a plurality of respective frequencies.

24. The RF antenna of claim 23, wherein each of the first slots is in the shape of a first ring having a first size, and each of the second slots is in the shape of a second ring having a second, larger size, and each of the first and second rings has an inner perimeter that surrounds a respective conductive portion of the ground plane layer.

* * * * *